US012649543B2

(12) United States Patent
Montague et al.

(10) Patent No.: US 12,649,543 B2
(45) Date of Patent: Jun. 9, 2026

(54) REMOTE CONTROLLER

(71) Applicant: Kai Concepts, LLC, Alameda, CA (US)

(72) Inventors: Donald Lewis Montague, Paia, HI (US); Joseph Andrew Brock, Alameda, CA (US); Tomasz Pawel Bartczak, Toronto (CA); Matthew Campbell Greaves, Oxley (AU); Alec Korver, Monument, CO (US); Dmitri Stepanov, Alameda, CA (US)

(73) Assignee: Kai Concepts, LLC, Alameda, CA (US)

( * ) Notice: Subject to any disclaimer, the term of this patent is extended or adjusted under 35 U.S.C. 154(b) by 0 days.

(21) Appl. No.: 18/411,165

(22) Filed: Jan. 12, 2024

(65) Prior Publication Data

US 2024/0149978 A1 May 9, 2024

Related U.S. Application Data

(63) Continuation of application No. 17/238,085, filed on Apr. 22, 2021, now Pat. No. 11,897,583.

(Continued)

(51) Int. Cl.

*B63B 1/24* (2020.01)
*B63B 1/28* (2006.01)

(Continued)

(52) U.S. Cl.

CPC ................ *B63B 1/242* (2013.01); *B63B 1/28* (2013.01); *B63B 32/40* (2020.02); *G08C 17/02* (2013.01);

(Continued)

(58) Field of Classification Search

CPC B63B 1/242; B63B 1/28; B63B 32/40; B63B 1/246; B63B 32/10;

(Continued)

(56) References Cited

U.S. PATENT DOCUMENTS

| | | | |
|---|---|---|---|
| 1,067,392 | A | 7/1913 | Barr |
| 3,405,677 | A | 10/1968 | Smith |

(Continued)

FOREIGN PATENT DOCUMENTS

| | | | |
|---|---|---|---|
| AU | 5012101 | A | 12/2002 |
| AU | 200150121 | A1 | 12/2002 |

(Continued)

OTHER PUBLICATIONS

Zapata Racing, Manuel Kit Electronique Wireless, Believed to be publicly available before Sep. 12, 2016, 37 pages.

(Continued)

*Primary Examiner* — Mohamed Abdo Algehaim
(74) *Attorney, Agent, or Firm* — Fitch, Even, Tabin & Flannery LLP

(57) ABSTRACT

A watercraft including a board having a top surface and a bottom surface and a hydrofoil attached to a strut. The strut attaches at the bottom surface of the board. The watercraft includes a movable portion coupled to the top surface of the board such that the movable portion is configured to move relative to a fixed portion of the board.

14 Claims, 19 Drawing Sheets

Related U.S. Application Data

(60) Provisional application No. 63/079,769, filed on Sep. 17, 2020, provisional application No. 63/014,014, filed on Apr. 22, 2020.

(51) Int. Cl.
*B63B 32/10* (2020.01)
*B63B 32/40* (2020.01)
*B63B 35/00* (2020.01)
*G08C 17/02* (2006.01)

(52) U.S. Cl.
CPC ............... *B63B 1/246* (2013.01); *B63B 32/10* (2020.02); *B63B 2035/008* (2013.01); *G08C 2201/10* (2013.01); *G08C 2201/32* (2013.01)

(58) Field of Classification Search
CPC .............. B63B 2035/008; B63B 32/66; B63B 1/00–2241/28; G08C 17/02; G08C 2201/10; G08C 2201/32
USPC ........................................................... 701/21
See application file for complete search history.

(56) References Cited

U.S. PATENT DOCUMENTS 3,498,131 A 3/1970 Rickey
3,515,000 A 6/1970 Baumoel
3,584,643 A 6/1971 Burke
3,593,050 A 7/1971 Ware
3,704,442 A 11/1972 Wright
3,804,048 A 4/1974 Cline
3,886,884 A 6/1975 Stark
3,902,444 A 9/1975 Stark
4,056,074 A 11/1977 Sachs
4,178,871 A 12/1979 Hirsch
4,382,382 A 5/1983 Wang
4,517,912 A 5/1985 Jones
4,676,101 A 6/1987 Baughman
5,042,299 A 8/1991 Wells
5,049,878 A 9/1991 Stern
5,062,378 A 11/1991 Bateman
5,178,089 A 1/1993 Hodel
5,226,313 A 7/1993 Murata
5,309,859 A 5/1994 Miller
5,429,562 A 7/1995 Milner
5,544,607 A 8/1996 Rorabaugh
5,719,556 A 2/1998 Albin
5,726,578 A 3/1998 Hook
5,735,167 A 4/1998 Puukangas
5,749,018 A 5/1998 Wess
5,809,926 A 9/1998 Kelsey
5,848,922 A 12/1998 Itima
6,095,076 A 8/2000 Nesbitt
6,142,840 A 11/2000 Efthymiou
6,178,905 B1 1/2001 Dynes
6,183,333 B1 2/2001 Hall
6,192,817 B1 2/2001 Dec
6,302,230 B1 10/2001 Kamen
6,311,631 B1 11/2001 Beecher
6,355,374 B1 3/2002 Wirsching
6,371,726 B1 4/2002 Jonsson
6,409,560 B1 6/2002 Austin
6,475,045 B2 11/2002 Schultz
6,568,340 B2 5/2003 Dec
6,578,506 B2 6/2003 Bieker
6,591,776 B2 7/2003 Miyazaki
6,651,763 B1 11/2003 Kamen
6,702,634 B2 3/2004 Jung
6,743,064 B2 6/2004 Gieseke
6,855,016 B1 2/2005 Jansen
6,901,872 B1 6/2005 Battle
6,902,446 B1 6/2005 Healey
6,962,079 B2 11/2005 Eguchi
6,966,808 B1 11/2005 Liao
7,047,901 B2 5/2006 Chen
7,089,875 B2 8/2006 Kurze
7,097,523 B2 8/2006 Woolley
7,138,774 B2 11/2006 Negoro
7,143,710 B2 12/2006 Lang
7,166,005 B2 1/2007 Tirloni
7,182,036 B2 2/2007 Levine
7,182,037 B2 2/2007 Otobe
7,226,329 B2 6/2007 Railey
7,243,607 B2 7/2007 Chesney
7,275,493 B1 10/2007 Brass
7,275,607 B2 10/2007 Kamen
7,298,056 B2 11/2007 Gizara
7,506,600 B2 3/2009 Furuya
7,601,041 B2 10/2009 McCarthy
7,731,555 B2 6/2010 Railey
7,980,191 B2 7/2011 Murphy
7,993,178 B2 8/2011 Railey
8,043,135 B1 10/2011 Corn
8,070,544 B2 12/2011 Roman
8,123,578 B2 2/2012 Mewis
8,166,905 B2 5/2012 Gratsch
8,262,425 B1 9/2012 Jones
8,290,636 B2 * 10/2012 Manning ................ A63C 17/12
701/1
8,312,831 B2 11/2012 Templeman
8,398,446 B2 3/2013 Railey
8,456,310 B2 6/2013 Becker
8,616,313 B2 12/2013 Simeray
8,636,552 B2 1/2014 Braden
8,702,458 B2 4/2014 Preston
8,807,250 B2 8/2014 Chen
8,851,947 B2 10/2014 Vlock
8,863,681 B2 10/2014 Howes
8,870,614 B2 10/2014 Railey
8,888,544 B1 11/2014 Guglielmo
8,951,079 B2 2/2015 Railey
9,051,038 B1 6/2015 Herber
9,056,654 B1 6/2015 Fraser
9,101,817 B2 8/2015 Doerksen
9,120,547 B2 9/2015 Vlock
9,162,741 B2 10/2015 Köhnsen
9,359,044 B2 6/2016 Langelaan
9,475,559 B2 10/2016 Czarnowski
9,573,656 B2 2/2017 Templeman
9,586,659 B2 * 3/2017 Langelaan ............... B63H 5/14
9,618,528 B2 4/2017 Leŝikar
9,643,694 B2 5/2017 Geislinger
9,645,138 B2 5/2017 Hamm
9,669,902 B2 6/2017 Geislinger
9,701,372 B2 7/2017 Railey
9,718,521 B2 8/2017 Derrah
9,718,528 B2 8/2017 Railey
9,758,962 B2 9/2017 Geislinger
9,789,935 B1 10/2017 Aguera
9,789,943 B2 10/2017 Lehmann
9,835,224 B2 12/2017 Geislinger
9,845,138 B2 12/2017 Köhnsen
9,891,620 B2 2/2018 Green
9,919,784 B1 * 3/2018 Fisher ....................... H02J 7/02
9,994,296 B1 * 6/2018 Balogh .................. B63B 79/10
10,029,775 B2 7/2018 Nikmanesh
10,054,443 B1 8/2018 Patel
10,057,676 B2 8/2018 Manning
10,082,788 B1 9/2018 Dengel
10,099,754 B2 10/2018 Tian
10,110,046 B1 10/2018 Esquibel
D843,303 S 3/2019 Leason
10,227,120 B2 3/2019 Ajello
10,235,870 B2 3/2019 Leason
10,266,239 B2 4/2019 Fry
10,279,873 B2 5/2019 Logosz
D852,112 S 6/2019 Leason
10,308,336 B1 6/2019 Vermeulen
D853,310 S 7/2019 Leason
10,358,194 B1 7/2019 Wengreen
D857,606 S 8/2019 Dane
10,456,658 B1 10/2019 Doerksen
D866,872 S 11/2019 Liu

(56) References Cited

U.S. PATENT DOCUMENTS 10,486,771 B2 11/2019 Tian
10,526,057 B2 1/2020 Kohnsen
10,532,797 B2 1/2020 Derrah
10,597,118 B2 3/2020 Montague
10,597,123 B2 3/2020 Bell
D882,010 S 4/2020 Vermillion
10,611,261 B2 4/2020 Pang
10,618,621 B1 4/2020 Rott
10,625,834 B2 4/2020 Macfarlane
D883,177 S 5/2020 Leason
10,647,387 B2 5/2020 Dombois
10,647,392 B2 5/2020 Trewern
10,668,987 B1 6/2020 Murphy
10,668,994 B2 6/2020 Frank
10,683,075 B2 6/2020 Schibli
10,759,503 B2 9/2020 Aguera
10,780,928 B2 9/2020 Pang
10,836,457 B2 * 11/2020 Geislinger .............. B60L 53/14
10,864,962 B2 12/2020 Pankratz
10,906,621 B2 2/2021 Gebhart
10,946,939 B1 3/2021 Montague
10,988,032 B2 4/2021 Pang
11,091,232 B1 8/2021 Montague
11,097,822 B2 8/2021 Aoki
11,273,364 B1 3/2022 Doerksen
11,334,079 B2 5/2022 Afman
11,383,797 B2 7/2022 Werner
11,685,481 B2 * 6/2023 Missler ................... B63B 32/60
114/55.54
11,703,866 B2 * 7/2023 Snyder .................... G01S 15/89
701/21
12,145,696 B2 11/2024 Sewell
12,168,497 B1 * 12/2024 Nielsen ................... B63B 79/40
2001/0042498 A1 11/2001 Burnham
2002/0072285 A1 6/2002 Jung
2003/0019316 A1 1/2003 Tews
2003/0089293 A1 5/2003 Vos
2003/0167991 A1 * 9/2003 Namanny ............... B63B 32/10
441/74
2004/0139905 A1 7/2004 Chen
2005/0266746 A1 12/2005 Murphy
2006/0249513 A1 11/2006 Duke
2007/0180904 A1 8/2007 Gao
2008/0041294 A1 2/2008 Diorio
2008/0168937 A1 7/2008 Ruan
2008/0243321 A1 10/2008 Walser
2008/0268730 A1 10/2008 Heesterman
2009/0023478 A1 1/2009 Lowles
2011/0014829 A1 1/2011 Burke
2011/0056423 A1 * 3/2011 Railey ..................... B63B 32/10
441/74
2011/0201238 A1 8/2011 Rott
2011/0212691 A1 * 9/2011 Rott ..................... H04B 1/3827
455/41.3
2011/0256518 A1 * 10/2011 Rott ................... A63B 69/0093
434/247
2012/0000409 A1 1/2012 Railey
2012/0126972 A1 5/2012 Rott
2013/0029547 A1 1/2013 Suzuki
2013/0157526 A1 6/2013 Martin
2013/0255560 A1 10/2013 Kinoshita
2013/0293179 A1 11/2013 Lee
2014/0053764 A1 2/2014 Ruan
2014/0141891 A1 5/2014 Georgy
2014/0232379 A1 * 8/2014 Nazarian ................ G01D 5/147
324/207.21
2015/0064995 A1 3/2015 Woods
2015/0104985 A1 * 4/2015 Langelaan ............... B63H 1/16
441/74
2015/0118923 A1 4/2015 Köhnsen
2015/0340672 A1 11/2015 Walpurgis
2016/0077543 A1 3/2016 Conro
2016/0185430 A1 6/2016 Langelaan
2016/0207601 A1 7/2016 Köhnsen
2017/0015397 A1 1/2017 Mitchell
2017/0043844 A1 2/2017 Chapman
2017/0045887 A1 * 2/2017 Mazin .................. G05D 1/0044
2017/0215033 A1 7/2017 Piraino
2017/0283015 A1 10/2017 Langelaan
2017/0351331 A1 * 12/2017 Weddle .................. G05D 1/005
2017/0368413 A1 12/2017 Shavit
2018/0043975 A1 2/2018 Tan
2018/0072383 A1 * 3/2018 Montague ............... B63B 32/64
2018/0099730 A1 4/2018 Riegerbauer
2018/0118311 A1 5/2018 Köhnsen
2018/0128882 A1 5/2018 Yoshiya
2018/0170493 A1 * 6/2018 Terada ................... A63B 35/12
2018/0170502 A1 * 6/2018 Terada ................. G05D 1/0016
2018/0181161 A1 * 6/2018 Long ................... B64C 29/0025
2018/0210485 A1 7/2018 Liang
2018/0281914 A1 10/2018 Burton
2018/0293881 A1 * 10/2018 Leason .................. G08C 17/02
2018/0335780 A1 * 11/2018 Stevens ................. B63C 9/0011
2018/0361870 A1 * 12/2018 Zhao ....................... B60L 53/68
2018/0370600 A1 12/2018 Geislinger
2019/0041891 A1 * 2/2019 Parazynski .............. G05G 1/06
2019/0054990 A1 2/2019 Gebhart
2019/0061557 A1 2/2019 Quick
2019/0061880 A1 2/2019 Bousquet
2019/0106190 A1 * 4/2019 Schibli ................. B63H 20/007
2019/0137993 A1 * 5/2019 Bertrand ................ B63H 25/02
2019/0161148 A1 5/2019 Trewern
2019/0168850 A1 6/2019 Tian
2019/0168851 A1 6/2019 Tian
2019/0173138 A1 6/2019 Tian
2019/0233063 A1 8/2019 Geislinger
2019/0233076 A1 8/2019 Aldama
2019/0263484 A1 8/2019 Wilson
2019/0344662 A1 11/2019 Warren
2019/0344862 A1 11/2019 Tian
2019/0344874 A1 * 11/2019 Liang ..................... G08C 17/00
2019/0389551 A1 12/2019 Aoki
2020/0018969 A1 1/2020 Ou
2020/0047849 A1 2/2020 Claughton
2020/0079479 A1 * 3/2020 Derrah ..................... B63H 1/16
2020/0102052 A1 4/2020 Geislinger
2020/0140042 A1 5/2020 Kohnsen
2020/0148063 A1 5/2020 Dastoor
2020/0172206 A1 6/2020 Terada
2020/0172207 A1 6/2020 Wengreen
2020/0172213 A1 6/2020 Rodriguez Rondon
2020/0197826 A1 * 6/2020 Zhang .................... A63H 30/04
2020/0231264 A1 7/2020 Imai
2020/0283102 A1 9/2020 Lind
2020/0331562 A1 * 10/2020 Dombois ................ B63B 1/286
2020/0391831 A1 * 12/2020 Jensen ................... B63H 21/17
2021/0024194 A1 1/2021 Fox
2021/0272446 A1 * 9/2021 Cortland .............. B67D 1/0888
2021/0323637 A1 * 10/2021 Leason ................... B63B 1/322
2021/0336461 A1 * 10/2021 Luthman .................. G08B 5/38
2021/0347442 A1 11/2021 Montague
2021/0394867 A1 12/2021 Montague
2022/0179442 A1 6/2022 Oshiro
2022/0179443 A1 6/2022 Oshiro
2022/0194525 A1 * 6/2022 Missler .................. B63H 21/22
2022/0274674 A1 * 9/2022 Peter ....................... B63B 32/10
2023/0009310 A1 * 1/2023 Hagen ..................... B63B 32/10
2023/0019805 A1 * 1/2023 Koehnsen ............... B63B 32/10
2023/0043251 A1 2/2023 Rasmussen
2023/0043812 A1 * 2/2023 Yanai ................... G05D 1/0875
2023/0249788 A1 * 8/2023 Inoue ..................... B63H 21/21
701/21
2024/0059375 A1 * 2/2024 Werner ................ H01R 13/521
2024/0140562 A1 * 5/2024 Trewern ................ H02J 7/0048
2024/0181825 A1 * 6/2024 Rocha ................. B64U 30/297
2024/0270366 A1 8/2024 Montague
2024/0326964 A1 10/2024 Inoue
2024/0326971 A1 10/2024 Inoue
2024/0326973 A1 10/2024 Inoue
2025/0214694 A1 7/2025 Montague

(56) References Cited

U.S. PATENT DOCUMENTS

FOREIGN PATENT DOCUMENTS

AU 2004100571 A4 8/2004
AU 2004215331 A1 9/2004
AU 2007100530 A4 9/2007
AU 2007202451 A9 8/2008
AU 2007202855 A1 1/2009
AU 2011203287 A1 1/2012
AU 2010312322 A1 4/2012
AU 2013100044 A4 2/2013
AU 2013290356 A1 2/2015
AU 2013290356 B2 3/2017
AU 2018203516 A1 1/2019
AU 2018390893 A1 7/2020
BR 8201283 U 3/2004
BR 102013022366 A2 8/2015
CN 2675546 Y 2/2005
CN 2875944 Y 3/2007
CN 101012003 A 8/2007
CN 201012743 Y 1/2008
CN 201012744 Y 1/2008
CN 201023637 Y 2/2008
CN 201086813 Y 7/2008
CN 101300971 Y 11/2008
CN 201220740 Y 4/2009
CN 201291996 Y 8/2009
CN 201300970 Y 9/2009
CN 201300971 Y 9/2009
CN 201329950 Y 10/2009
CN 201331716 Y 10/2009
CN 201347194 Y 11/2009
CN 201390374 Y 1/2010
CN 201406017 Y 2/2010
CN 201406019 Y 2/2010
CN 201406020 Y 2/2010
CN 201407093 Y 2/2010
CN 201407094 Y 2/2010
CN 201415754 Y 3/2010
CN 201437400 U 4/2010
CN 201447051 U 5/2010
CN 101734354 A 6/2010
CN 101734355 A 6/2010
CN 101734356 A 6/2010
CN 101746490 A 6/2010
CN 101870343 A 10/2010
CN 101870344 A 10/2010
CN 101870346 A 10/2010
CN 101871382 A 10/2010
CN 101927817 A 12/2010
CN 201914426 U 8/2011
CN 202264871 U 6/2012
CN 202574577 U 12/2012
CN 202574578 U 12/2012
CN 101875396 B 9/2013
CN 103373451 A 10/2013
CN 103373453 A 10/2013
CN 103419908 A 12/2013
CN 203381780 U 1/2014
CN 203567910 U 4/2014
CN 203593146 U 5/2014
CN 101879934 B 9/2014
CN 104229063 A 12/2014
CN 104229088 A 12/2014
CN 204056245 U 12/2014
CN 104260845 A 1/2015
CN 104260869 A 1/2015
CN 104295419 A 1/2015
CN 104309792 A 1/2015
CN 204124333 U 1/2015
CN 204197224 U 3/2015
CN 204197225 U 3/2015
CN 204197244 U 3/2015
CN 204197245 U 3/2015
CN 204197246 U 3/2015
CN 204197248 U 3/2015
CN 204197257 U 3/2015
CN 204197259 U 3/2015
CN 204197260 U 3/2015
CN 204197261 U 3/2015
CN 204200363 U 3/2015
CN 204200365 U 3/2015
CN 204200366 U 3/2015
CN 204200367 U 3/2015
CN 204200423 U 3/2015
CN 204200424 U 3/2015
CN 204200433 U 3/2015
CN 204200443 U 3/2015
CN 204436577 U 7/2015
CN 204659986 U 9/2015
CN 103661833 B 3/2016
CN 205131588 U 4/2016
CN 105691563 A 6/2016
CN 205418042 U 8/2016
CN 205469703 U 8/2016
CN 205469704 U 8/2016
CN 104309792 B 9/2016
CN 105947135 A 9/2016
CN 105966562 A 9/2016
CN 105966563 A 9/2016
CN 105966564 A 9/2016
CN 105966565 A 9/2016
CN 106005300 A 10/2016
CN 106054707 A 10/2016
CN 205632952 U 10/2016
CN 106081001 A 11/2016
CN 205675195 U 11/2016
CN 206054103 U 3/2017
CN 104228695 B 4/2017
CN 206087218 U 4/2017
CN 106846757 A 6/2017
CN 206297715 U 7/2017
CN 206317993 U 7/2017
CN 206446772 U 8/2017
CN 206466156 U 9/2017
CN 206466161 U 9/2017
CN 206466166 U 9/2017
CN 206466174 U 9/2017
CN 206466180 U 9/2017
CN 206466191 U 9/2017
CN 206471439 U 9/2017
CN 206471884 U 9/2017
CN 206606355 U 11/2017
CN 105923116 B 1/2018
CN 107628209 A 1/2018
CN 206914584 U 1/2018
CN 206984297 U 2/2018
CN 207010363 U 2/2018
CN 107776839 A 3/2018
CN 207129115 U 3/2018
CN 107953977 A 4/2018
CN 207257921 U 4/2018
CN 207389479 U 5/2018
CN 207389513 U 5/2018
CN 108189978 A 6/2018
CN 207450184 U 6/2018
CN 207473824 U 6/2018
CN 207496901 U 6/2018
CN 207496902 U 6/2018
CN 207510694 U 6/2018
CN 207550443 U 6/2018
CN 207550444 U 6/2018
CN 207670628 U 7/2018
CN 108357650 A 8/2018
CN 207683736 U 8/2018
CN 207683737 U 8/2018
CN 104260846 B 9/2018
CN 108482604 A 9/2018
CN 108583797 A 9/2018
CN 207851575 U 9/2018
CN 108609124 A 10/2018
CN 108725709 A 11/2018
CN 108909963 A 11/2018
CN 208134578 U 11/2018
CN 208165225 U 11/2018

(56) References Cited

FOREIGN PATENT DOCUMENTS

| | | | |
|---|---|---|---|
| CN | 108945331 | A | 12/2018 |
| CN | 108974272 | A | 12/2018 |
| CN | 108974298 | A | 12/2018 |
| CN | 208291439 | U | 12/2018 |
| CN | 109131766 | A | 1/2019 |
| CN | 109263823 | A | 1/2019 |
| CN | 208344507 | U | 1/2019 |
| CN | 208407991 | B | 1/2019 |
| CN | 109334888 | A | 2/2019 |
| CN | 109334889 | A | 2/2019 |
| CN | 109334890 | A | 2/2019 |
| CN | 208498755 | U | 2/2019 |
| CN | 107215436 | B | 3/2019 |
| CN | 208616170 | U | 3/2019 |
| CN | 208630821 | U | 3/2019 |
| CN | 109572954 | A | 4/2019 |
| CN | 109625200 | A | 4/2019 |
| CN | 208715417 | U | 4/2019 |
| CN | 208715431 | U | 4/2019 |
| CN | 208715437 | U | 4/2019 |
| CN | 208715455 | U | 4/2019 |
| CN | 208760858 | U | 4/2019 |
| CN | 208760859 | U | 4/2019 |
| CN | 208760860 | U | 4/2019 |
| CN | 208760861 | U | 4/2019 |
| CN | 208760862 | U | 4/2019 |
| CN | 208781922 | U | 4/2019 |
| CN | 208789898 | U | 4/2019 |
| CN | 109774891 | A | 5/2019 |
| CN | 109795610 | A | 5/2019 |
| CN | 208855842 | U | 5/2019 |
| CN | 208915389 | U | 5/2019 |
| CN | 109850090 | A | 6/2019 |
| CN | 109895964 | A | 6/2019 |
| CN | 208931601 | U | 6/2019 |
| CN | 208931604 | U | 6/2019 |
| CN | 208931605 | U | 6/2019 |
| CN | 208931617 | U | 6/2019 |
| CN | 209000208 | U | 6/2019 |
| CN | 110039578 | A | 7/2019 |
| CN | 209159955 | U | 7/2019 |
| CN | 209176872 | U | 7/2019 |
| CN | 110085788 | A | 8/2019 |
| CN | 110171092 | A | 8/2019 |
| CN | 110182331 | A | 8/2019 |
| CN | 209253549 | U | 8/2019 |
| CN | 209258326 | U | 8/2019 |
| CN | 209258351 | U | 8/2019 |
| CN | 209258352 | U | 8/2019 |
| CN | 209290629 | U | 8/2019 |
| CN | 107128454 | B | 9/2019 |
| CN | 107933845 | B | 9/2019 |
| CN | 110239687 | A | 9/2019 |
| CN | 209366402 | U | 9/2019 |
| CN | 209366403 | U | 9/2019 |
| CN | 209366404 | U | 9/2019 |
| CN | 209366405 | U | 9/2019 |
| CN | 209366406 | U | 9/2019 |
| CN | 209366407 | U | 9/2019 |
| CN | 209366408 | U | 9/2019 |
| CN | 209369930 | U | 9/2019 |
| CN | 209385232 | U | 9/2019 |
| CN | 209441573 | | 9/2019 |
| CN | 209441573 | U | 9/2019 |
| CN | 110350341 | A | 10/2019 |
| CN | 110356524 | A | 10/2019 |
| CN | 110362080 | A | 10/2019 |
| CN | 209454955 | U | 10/2019 |
| CN | 209479921 | U | 10/2019 |
| CN | 110406642 | A | 11/2019 |
| CN | 110481728 | A | 11/2019 |
| CN | 209581796 | U | 11/2019 |
| CN | 209581797 | U | 11/2019 |
| CN | 209581798 | U | 11/2019 |
| CN | 209600753 | U | 11/2019 |
| CN | 110562408 | A | 12/2019 |
| CN | 209739293 | U | 12/2019 |
| CN | 209766523 | U | 12/2019 |
| CN | 209833934 | U | 12/2019 |
| CN | 209833939 | U | 12/2019 |
| CN | 108407991 | B | 1/2020 |
| CN | 110683005 | A | 1/2020 |
| CN | 209913096 | U | 1/2020 |
| CN | 209921564 | U | 1/2020 |
| CN | 209921565 | U | 1/2020 |
| CN | 209938884 | U | 1/2020 |
| CN | 110816758 | A | 2/2020 |
| CN | 110844006 | A | 2/2020 |
| CN | 210068712 | U | 2/2020 |
| CN | 110911888 | A | 3/2020 |
| CN | 110920812 | A | 3/2020 |
| CN | 110920813 | A | 3/2020 |
| CN | 110920847 | A | 3/2020 |
| CN | 210149516 | U | 3/2020 |
| CN | 210149517 | U | 3/2020 |
| CN | 210212690 | U | 3/2020 |
| CN | 210212691 | U | 3/2020 |
| CN | 110949620 | A | 4/2020 |
| CN | 210310790 | U | 4/2020 |
| CN | 210364284 | U | 4/2020 |
| CN | 210364287 | U | 4/2020 |
| CN | 210478964 | U | 5/2020 |
| CN | 210478965 | U | 5/2020 |
| CN | 210478967 | U | 5/2020 |
| CN | 210503084 | U | 5/2020 |
| CN | 210526789 | U | 5/2020 |
| CN | 110901869 | B | 6/2020 |
| CN | 111268038 | A | 6/2020 |
| CN | 111284636 | A | 6/2020 |
| CN | 210806779 | U | 6/2020 |
| CN | 210852818 | U | 6/2020 |
| CN | 210971446 | U | 7/2020 |
| CN | 211018557 | U | 7/2020 |
| CN | 211126279 | U | 7/2020 |
| CN | 211139588 | U | 7/2020 |
| CN | 211336359 | U | 8/2020 |
| CN | 211364859 | U | 8/2020 |
| CN | 109795610 | B | 11/2020 |
| DE | 3634775 | | 4/1988 |
| DE | 10103126 | | 9/2002 |
| DE | 202006000210 | U1 | 3/2006 |
| DE | 202007003106 | U1 | 7/2007 |
| DE | 202010000559 | U1 | 6/2010 |
| DE | 102010032014 | A1 | 1/2012 |
| DE | 202013007100 | U1 | 9/2013 |
| DE | 202014006552 | U1 | 11/2014 |
| DE | 102014005314 | A1 | 10/2015 |
| DE | 202017103703 | U1 | 7/2017 |
| DE | 202017107819 | U1 | 1/2018 |
| DE | 202017107820 | U1 | 1/2018 |
| DE | 202017107821 | U1 | 1/2018 |
| DE | 202017107824 | U1 | 1/2018 |
| DE | 202017107826 | U1 | 1/2018 |
| DE | 102018113137 | A1 | 2/2019 |
| DE | 102017130946 | A1 | 6/2019 |
| DE | 102017130949 | A1 | 6/2019 |
| DE | 102017130955 | A1 | 6/2019 |
| DE | 102017130959 | A1 | 6/2019 |
| DE | 102017130963 | A1 | 6/2019 |
| DE | 102017130966 | A1 | 6/2019 |
| DE | 102018100696 | A1 | 6/2019 |
| DE | 102018129501 | A1 | 9/2019 |
| DE | 202019103496 | U1 | 9/2019 |
| DE | 202018104741 | U1 | 11/2019 |
| DE | 102018215176 | A1 | 3/2020 |
| DE | 102018127650 | A1 | 5/2020 |
| EP | 1538074 | | 6/2005 |
| EP | 1538074 | A1 | 6/2005 |
| EP | 2693284 | | 2/2014 |
| EP | 3041735 | A1 | 7/2016 |
| EP | 1955025 | B1 | 3/2017 |
| EP | 3526112 | A1 | 8/2019 |
| EP | 3526113 | A1 | 8/2019 |
| EP | 3529142 | A1 | 8/2019 |

(56) References Cited

FOREIGN PATENT DOCUMENTS

| | | | |
|---|---|---|---|
| EP | 3529143 | A1 | 8/2019 |
| EP | 3552947 | A1 | 10/2019 |
| EP | 3277574 | B1 | 11/2019 |
| EP | 3640882 | A1 | 4/2020 |
| EP | 3747754 | | 12/2020 |
| EP | 4180316 | | 5/2023 |
| EP | 4180316 | A | 5/2023 |
| ES | 1153639 | Y | 7/2016 |
| FR | 3078680 | B1 | 5/2020 |
| GB | 2132773 | | 7/1984 |
| GB | 2580022 | A | 7/2020 |
| GB | 2627370 | A | 8/2024 |
| HK | 1250973 | A1 | 1/2019 |
| IN | 200701396 | I2 | 7/2008 |
| JP | 2002154479 | A | 5/2002 |
| JP | 2002193185 | A | 7/2002 |
| JP | 2008189169 | A | 8/2008 |
| JP | 2008230315 | A | 10/2008 |
| JP | 2009018702 | A | 1/2009 |
| JP | 2010173405 | A | 8/2010 |
| JP | 3163820 | U | 11/2010 |
| JP | 4640760 | B2 | 3/2011 |
| JP | 3183445 | U | 5/2013 |
| JP | 5221737 | B2 | 6/2013 |
| JP | 2014043150 | A | 3/2014 |
| JP | 5791376 | B2 | 10/2015 |
| JP | 2015177735 | | 10/2015 |
| JP | 2020111331 | A | 7/2020 |
| KR | 100560702 | B1 | 3/2006 |
| KR | 100572804 | B1 | 4/2006 |
| KR | 100581491 | B1 | 5/2006 |
| KR | 20090006619 | A | 1/2009 |
| KR | 20090098306 | A | 9/2009 |
| KR | 20100010874 | U | 11/2010 |
| KR | 101024595 | B1 | 3/2011 |
| KR | 200454353 | Y1 | 6/2011 |
| KR | 101491661 | B1 | 2/2015 |
| KR | 20160027555 | A | 3/2016 |
| KR | 20160057060 | A | 5/2016 |
| KR | 101697338 | B1 | 1/2017 |
| KR | 20170000622 | | 1/2017 |
| KR | 101713936 | B1 | 3/2017 |
| KR | 101767476 | B1 | 8/2017 |
| KR | 20170090702 | A | 8/2017 |
| KR | 101857099 | B1 | 5/2018 |
| KR | 20190063727 | A | 6/2019 |
| KR | 101978043 | B1 | 8/2019 |
| KR | 102052195 | B1 | 12/2019 |
| KR | 102050718 | B1 | 1/2020 |
| KR | 200490972 | | 1/2020 |
| KR | 102095292 | B1 | 3/2020 |
| KR | 102095294 | B1 | 3/2020 |
| KR | 102103228 | B1 | 4/2020 |
| KR | 102103229 | B1 | 4/2020 |
| KR | 102116532 | B1 | 6/2020 |
| KR | 102133778 | B1 | 7/2020 |
| NO | 20181547 | A1 | 6/2020 |
| PL | 3277574 | T3 | 6/2020 |
| TW | M257328 | U | 2/2005 |
| TW | M308901 | U | 4/2007 |
| TW | 200848320 | A | 12/2008 |
| TW | 201000361 | A | 1/2010 |
| TW | 1334793 | B | 12/2010 |
| TW | M461592 | U | 9/2013 |
| TW | 1605324 | B | 11/2017 |
| TW | M552465 | U | 12/2017 |
| WO | 2002092420 | A1 | 11/2002 |
| WO | 2005058685 | A1 | 6/2005 |
| WO | 2006014085 | A1 | 2/2006 |
| WO | 2006042359 | A1 | 4/2006 |
| WO | 2007072185 | A2 | 6/2007 |
| WO | 2008022863 | | 2/2008 |
| WO | 2009144400 | A2 | 12/2009 |
| WO | 2011047431 | A1 | 4/2011 |
| WO | 2011049470 | | 4/2011 |
| WO | 2012013770 | A2 | 2/2012 |
| WO | 2013026714 | A1 | 2/2013 |
| WO | 2015039970 | A1 | 3/2015 |
| WO | 2016003121 | A1 | 1/2016 |
| WO | 2017069322 | A1 | 4/2017 |
| WO | 2017091537 | A1 | 6/2017 |
| WO | 2017153338 | A1 | 9/2017 |
| WO | 2017221233 | A1 | 12/2017 |
| WO | 2018149044 | A1 | 8/2018 |
| WO | 2018234969 | A1 | 12/2018 |
| WO | 2019072196 | A1 | 4/2019 |
| WO | 2019073126 | A1 | 4/2019 |
| WO | 2019122087 | A1 | 6/2019 |
| WO | 2019122091 | A1 | 6/2019 |
| WO | 2019122098 | A1 | 6/2019 |
| WO | 2019122176 | A1 | 6/2019 |
| WO | 2019122185 | A1 | 6/2019 |
| WO | 2019122225 | A1 | 6/2019 |
| WO | 2019122321 | A1 | 6/2019 |
| WO | 2019129687 | A1 | 7/2019 |
| WO | 2019141799 | A1 | 7/2019 |
| WO | 2019143276 | A1 | 7/2019 |
| WO | 2019183668 | A1 | 10/2019 |
| WO | 2019203135 | A1 | 10/2019 |
| WO | 2019222119 | A1 | 11/2019 |
| WO | 2020042299 | A1 | 3/2020 |
| WO | 2020042300 | A1 | 3/2020 |
| WO | 2020042301 | A1 | 3/2020 |
| WO | 2020042302 | A1 | 3/2020 |
| WO | 2020056822 | A1 | 3/2020 |
| WO | 2020056823 | A1 | 3/2020 |
| WO | 2020107665 | A1 | 6/2020 |
| WO | 2020113768 | A1 | 6/2020 |
| WO | 2020176033 | A1 | 9/2020 |
| WO | 2021191729 | | 9/2021 |
| WO | 2022174296 | | 8/2022 |
| WO | 2023094668 | A | 6/2023 |
| WO | 2023094668 | A1 | 6/2023 |
| WO | 2024170899 | A | 8/2024 |
| WO | 2024170899 | A1 | 8/2024 |

OTHER PUBLICATIONS

Autodesk Instructables, "Building an Arduino Water Level Detection Sensor," presently believed to be publicly available at least before Mar. 20, 2023, 7 pages.

Level Hydrofoils, Wayback Machine, Archive of https://www.levelfoils.com/technology , dated Sep. 29, 2022, 7 pages.

Omron, "Technical Explanation for Level Controllers," presently believed to be publicly available at least before Mar. 20, 2023, 31 pages.

Taaroa Hydrofoil, Wayback Machine, Archive of https://www.taaroa-hydrofil.com/iup-product dated Dec. 2, 2022, 5 pages.

7M Engineering, "Assembly 1," https://vimeo.com/361237245, Sep. 20, 2019.

Asa Bonthelius, "Hoglage," BATNYTT (Sep. 2009).

European Search Report for Application No. 22206528.6 dated Apr. 11, 2023.

European Search Report in corresponding European Patent Application EP 18163734.9, dated Sep. 19, 2018.

Evolo Final Report, Apr. 23, 2009.

International Search Report in corresponding PCT/US2018/023959 dated Jul. 3, 2018.

JetSurfing Nation jet boards & efoils, "Awake RAVIK Premium Electric Surfboard—unboxing and review Part 1," https://www.youtube.com/watch?v=i3P9NWw4fpg, Oct. 1, 2019.

Ray Vellinga, "Hydrofoil—Thrilling Swedish Invention," https://www.youtube.com/watch?V=klAggNlir9A&feature=youtu.be, Oct. 27, 2011.

Scrapheaper, "Trampofoil—the originals* from Sweden," https://www.youtube.com/watch?v=QQvYogFP9mw&feature=youtu.be, Aug. 15, 2010.

* cited by examiner

REMOTE CONTROLLER

CROSS-REFERENCE TO RELATED APPLICATIONS

This application is a continuation of U.S. application Ser. No. 17/238,085, filed Apr. 22, 2021, which claims the benefit of U.S. Provisional Application No. 63/079,769 filed Sep. 17, 2020, and U.S. Provisional Application No. 63/014,014 filed Apr. 22, 2020, which are incorporated herein by reference in their entirety. The related U.S. application Ser. No. 17/077,784 filed Oct. 22, 2020, now issued as U.S. Pat. No. 10,946,939; U.S. application Ser. No. 17/162,918 filed Jan. 29, 2021, now issued as U.S. Pat. No. 11,091,232; International Application Number PCT/US21/28717 filed on Apr. 22, 2021; and International Application Number PCT/US21/28716 filed Apr. 22, 2021, are all incorporated herein by reference in their entireties.

FIELD

This disclosure relates to electrically propelled watercraft devices that include hydrofoils.

BACKGROUND

Some watercraft include hydrofoils that extend below a board or inflatable platform on which a user rides. One such hydrofoiling watercraft is disclosed in U.S. Pat. No. 10,940,917, which is incorporated herein by reference in its entirety. Many existing hydrofoiling watercraft include a battery in a cavity of the board, an electric motor mounted to a strut of the hydrofoil to propel the watercraft, with power wires extending within the strut between the battery and the electric motor. The hydrofoils of these electric watercraft are not easily detachable from the board due to these wires extending within the strut and into the board. Additionally, since the battery is housed within a cavity of the board, the upper end of the strut may need to form a watertight seal with the board to prevent fluid from entering the cavity of the board and damaging the battery or other electronics within the cavity of the board.

Another problem with existing watercraft having a board and an electric motor is that radio frequency signals are blocked by the board or noise from the motor causes interference with the radio frequency communications of the watercraft, for example, between the watercraft and a wireless remote controller. Another problem with existing hydrofoiling watercraft is that the ride height of the board when in the foiling mode is not accurately determined. For example, current hydrofoiling watercraft include a radar or ultrasonic sensor mounted to the underside of the board to detect the distance between the board and the surface of the water. However, due to the waves and splashing that occurs above the surface of the water, the ride height measurements are often inaccurate.

Many existing hydrofoiling watercraft are steered by the rider shifting their weight to one side of the board or the other. As a result, riders must keep their balance while operating the hydrofoiling watercraft while shifting their weight to steer the watercraft. As a result, operating the watercraft requires skill and experience. Thus, there is a need for a hydrofoiling watercraft that may be steered or controlled by other methods to make the hydrofoiling watercraft easier to operate or ride.

SUMMARY

Generally speaking and pursuant to these various embodiments, a watercraft is provided comprising a board having a top surface and a bottom surface. The watercraft includes a hydrofoil having a strut attached at the bottom surface of the board. The watercraft further includes a movable portion coupled to the top surface of the board such that the movable portion is configured to move relative to a fixed portion of the board. This device allows a rider to shift the center of gravity of the hydrofoiling board, allowing the device to enter and exit a hydrofoiling mode while the rider remains seated or prone on the watercraft.

In some examples, the movable portion is a plate configured to slide longitudinally relative to the board. In other examples, the movable portion is a saddle configured to support a rider, the saddle movable longitudinally relative to the board.

DETAILED DESCRIPTION

Figure 1A:
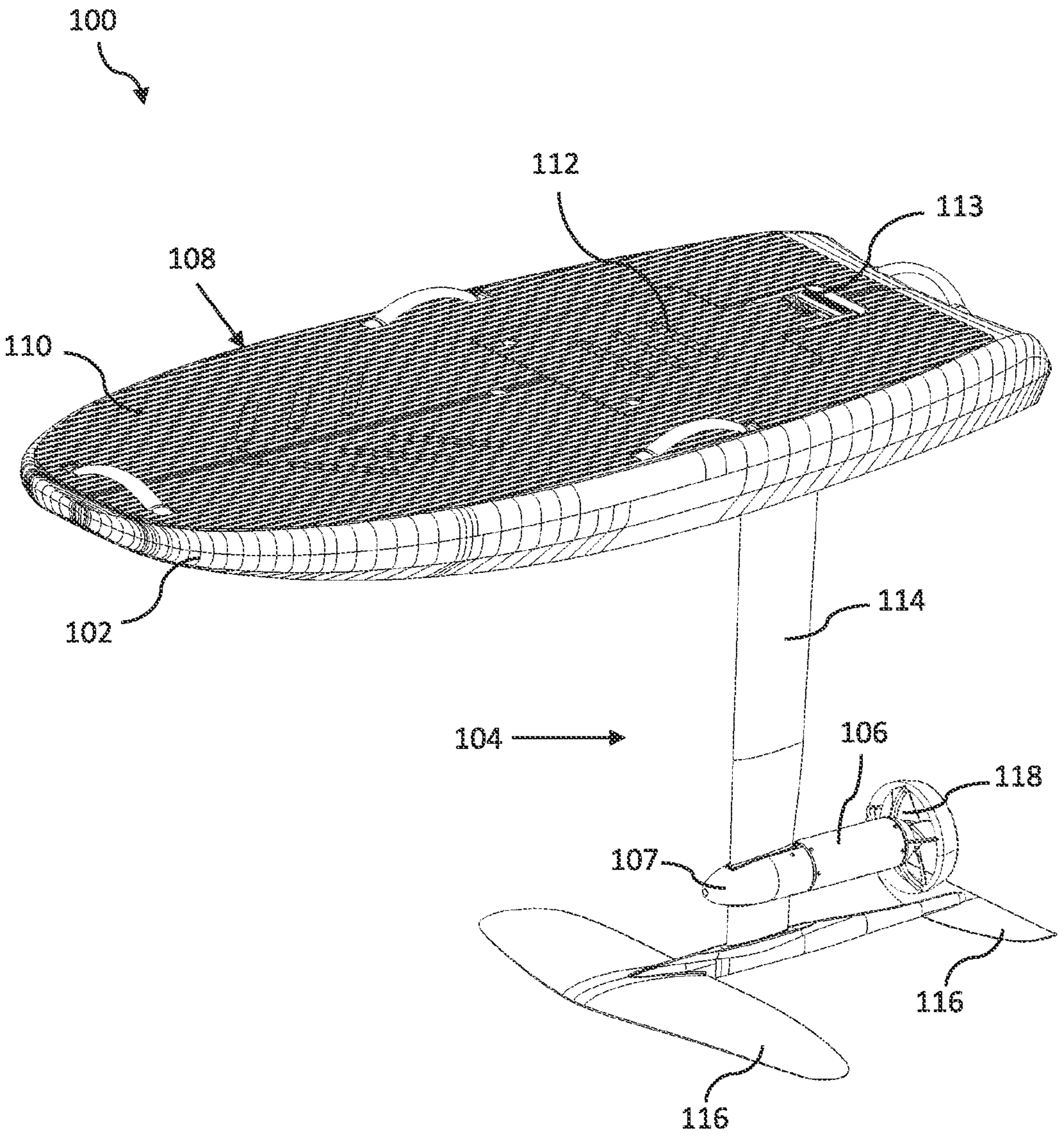
FIG. 1A is a front perspective view of a hydrofoiling watercraft having a board, a hydrofoil, and an electric propulsion system.

With reference to FIGS. 1A-E, a hydrofoiling watercraft 100 is shown having a board 102, a hydrofoil 104, and an electric propulsion unit 106 mounted to the hydrofoil 104. The board 102 may be a rigid board formed of fiberglass, carbon fiber or a combination thereof, or an inflatable board. The top surface of the board 102 forms a deck 108 on which a user or rider may lay, sit, kneel, or stand to operate the watercraft 100. The deck 108 may include a deck pad comprising a rubber layer 110 affixed to the top surface of the board 102 to provide increased friction for the rider when the rider is on the deck 108. The deck 108 may thus aid to prevent the rider from slipping on the deck 108 during operation or when the top surface 108 becomes wet. The rubber layer 110 may include ridges and grooves extending along the length of the deck 108. Water on the top surface of the board 102 may be collected or drain into the grooves of the rubber layer and flow along the grooves and off of the top surface of the board 102. The ridges of the rubber layer may support the rider. Since the water is draining off of the ridges to the grooves, the portion of the deck 108 supporting the rider (i.e., the ridges) may be less wet and thus provide increased grip over a smooth surface. Thus, the rider is less prone to slipping or sliding along the deck 108. The board 102 may further include carrying handles 109 that aid in transporting the board 102. In one embodiment, handles 109 are retractable such that the handles are drawn flush with the board 102 when not in use. The handles 109 may be extended outward when needed to transport the board 102.

The hydrofoiling watercraft 100 may further include a battery box 112 that is mounted into a cavity 113 on the top side of the board 102. The battery box 112 may house a battery for powering the watercraft 100, an intelligent power unit (IPU) that controls the power provided to the electric propulsion unit 106, communication circuitry, Global Navigation Satellite System (GNSS) circuitry, and/or a computer (e.g., processor and memory) for controlling the watercraft or processing data collected by one or more sensors of the watercraft 100. The watercraft 100 may determine the location of the watercraft at any given time using the GNSS circuitry. The communication circuitry may be configured to communicate with a wireless remote controller, such as the wireless handheld remote controllers 200 of FIGS. 6A-B.

The communication circuitry may further be configured to communicate via Bluetooth, cellular, Wi-Fi, Zigbee and the like. The IPU or computer may communicate with remote devices via the communication circuitry. For example, the communication circuitry enables the watercraft 100 to communicate with a server computer. The watercraft 100 may communicate information pertaining to the performance of the watercraft to the server computer for processing and/or storage. For example, the watercraft 100 may communicate information including the location of the watercraft, performance, operating conditions, status of the components of the watercraft, detected problems with the watercraft 100, rider information (e.g., experience level, height, weight). The watercraft may record information regarding trips taken by the watercraft 100 including the route taken, the speed of the watercraft, number of times the rider fell off, etc. In some embodiments, the watercraft 100 may be configured to automatically communicate the location of the watercraft 100 to a remote device when the battery is low or dead, or some other component of the watercraft 100 has been determined to have failed. This may alert or notify another that the rider may be stranded on the watercraft 100 and may need help returning back to shore.

The hydrofoil 104 includes a strut 114 and one or more hydrofoil wings 116. The propulsion unit 106 may be mounted to the strut 114. The propulsion unit 106 may be mounted to the strut 114 by a bracket 107 that permits the propulsion unit 106 to be mounted to or clamped onto the strut 114 at varying heights or positions along the strut. Power wires and a communication cable may extend through the strut 114 from the battery box 112 to provide power and operating instructions to the propulsion unit 106. The propulsion unit 106 may contain an electronic speed controller (ESC) and a motor. In some embodiments, the propulsion unit 106 also includes the battery and/or the IPU. The motor includes a shaft that is coupled to a propeller 118. The ESC provides power to the motor based on the control signals received from the IPU of the battery box 112 to operate the motor and cause the shaft of the motor to rotate. Rotation of the shaft turns the propeller which drives the watercraft through the water. In other forms, a waterjet may be used in place of the propeller to drive the watercraft through the water.

As the hydrofoiling watercraft 100 is driven through the water by way of the motor, the water flowing over the hydrofoil wings 116 provides lift. This causes the board 102 to rise above the surface of the water when the watercraft 100 is operated at or above certain speeds such that sufficient lift is created. While the hydrofoil wings 116 are shown mounted to the base of the strut 114, in other forms, the hydrofoil wings 116 may extend from the propulsion unit 106. The propulsion unit 106 thus may be a fuselage from which hydrofoil wings 116 extend. In some forms, the hydrofoil wings 116 are mounted above the propulsion unit 106 and closer to the board 102 than the propulsion unit 106. In some forms, the hydrofoil wings 116 and/or the propulsion unit 106 include movable control surfaces that may be adjusted to provide increased or decreased lift and/or to steer the watercraft 100. For instance, the movable control surfaces may be pivoted to adjust the flow of fluid over the hydrofoil wing or the propulsion unit 106 to adjust the lift provided by the hydrofoil wing, increase the drag, and/or turn the watercraft 100. The wings 116 may include an actuator, such as a motor, linear actuator or dynamic servo, that is coupled to the movable control surface and configured to move the control surfaces between various positions. The position of the movable control surface may be adjusted by a computer of the watercraft 100, for instance, the IPU or propulsion unit 106. The actuators may receive a control signal from a computing device of the watercraft 100 via the power wires and/or a communication cable extending through the strut 114 and/or the wings 116 to adjust to the position of the control surfaces. The computing device may operate the actuator and cause the actuator to adjust the position of one or more movable control surfaces. The position of the movable control surfaces may be adjusted to maintain a ride height of the board 102 of the watercraft above the surface of the water.

Figure 1B:
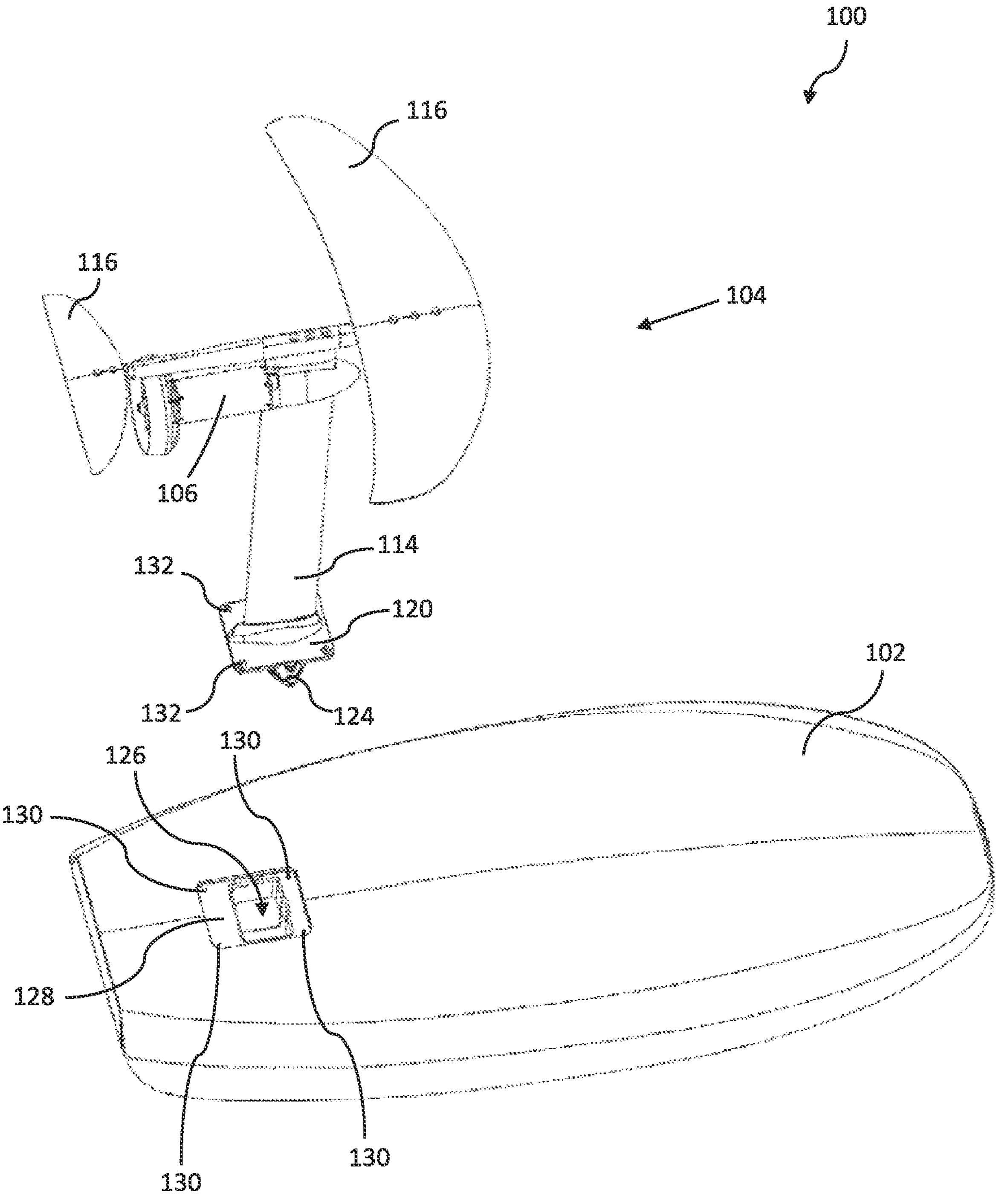
FIG. 1B is a bottom perspective view of the hydrofoiling watercraft of FIG. 1A shown with the hydrofoil detached from the board.
Figure 1C:
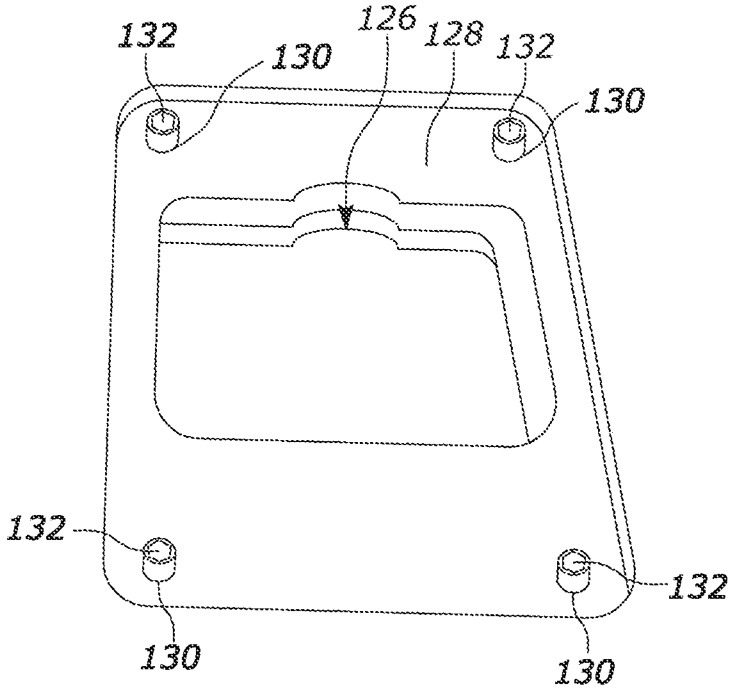
FIG. 1C is a rear perspective view of a hydrofoil attachment portion of the board of the hydrofoiling watercraft of FIG. 1A.
Figure 1D:
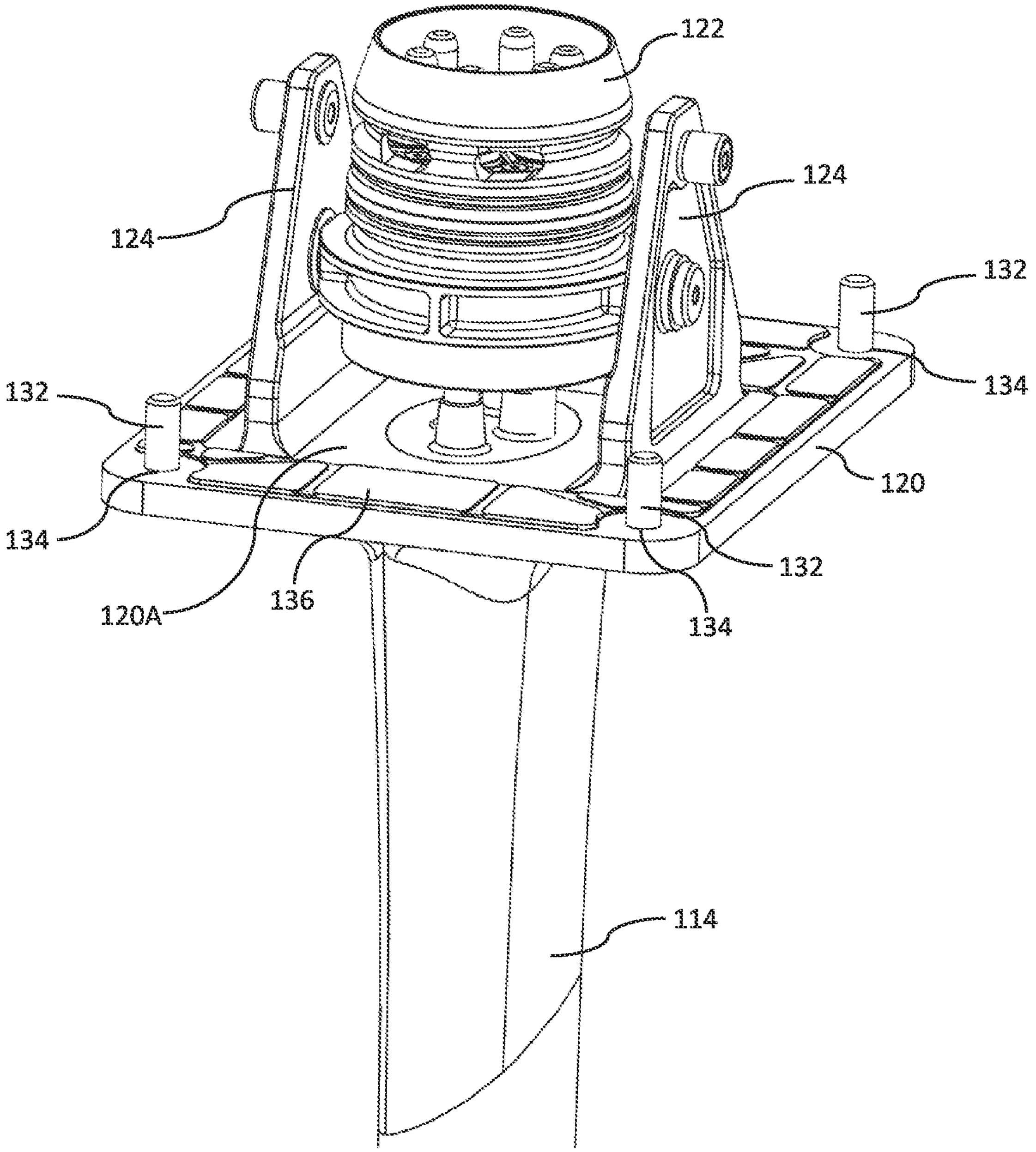
FIG. 1D is a front perspective view of an upper end of a strut of the hydrofoil of the hydrofoiling watercraft of FIG. 1A.

The upper end of the strut 114 may be removably coupled to the board 102. As shown in FIGS. 1B and 1D, the strut

114 includes an attachment plate 120 configured to engage the board 102 to be fastened thereto. The upper end of the strut 114 may include a connector 122 and brackets 124 to which the battery box 112 engages to attach the battery box 112 to the watercraft 100. The board 102 may define a hole 126 extending from the top side of the board 102 to the bottom side of the board 102. The hole 126 may extend from within the cavity 113 in the top side of the board 102. Thus, when the upper end of the strut 114 is mounted to the board 102, the connector 122 and attachment brackets 124 may extend into the cavity 113 into which the battery box 112 is placed. The bottom side of the board 102 may define a recessed portion 128 for receiving the attachment plate 120 of the upper end of the strut 114. The recessed portion 128 may define holes 130 into which fasteners 132 may extend to attach the strut 112 to the board 102. The peripheral edge of the attachment plate 120 may have the same shape or correspond to the shape of the recessed portion 128 such that the attachment plate 120 can be at least partially received within the recessed portion 128. The attachment plate 120 defines holes 134 through which the fasteners 132 (e.g., screws or bolts) may extend. The fasteners 132 may be extended through the holes 134 of the attachment plate 120 and into the holes 130 of the recessed portion 128 to secure the strut 114 to the board 102. The recessed portion 128 may have a depth that is the same or similar to the thickness of the attachment plate 120 such that the attachment plate is flush with the bottom surface of the board 102 when the attachment plate 120 is positioned within the recess portion 128.

In alternative embodiments the strut 114 includes a rotating mast that folds into a compact position when the watercraft is not in use. In some such embodiments, a single screw may be used to release the mast or lock the strut 114 in the operable position. Alternatively, a quick release/attachment mechanism could be used for attaching the strut 114 to the board easily and quickly and without use of additional tools.

In one embodiment, the holes 134 of the board 102 include threaded inserts that are mounted in a composite structural support within the board 102 (e.g., a series of posts or supporting wall within the board 102). The structural support within the board 102 may extend from the top to the bottom surface of the board 102. In one form, a series of direct fiber links between the top and the bottom of the board 102 are created in this area of the board 102 to provide structural rigidity to the board. The structural threaded inserts serve as mounting holes for receiving mounting bolts or fasteners 132.

With reference to FIG. 1D, a vibration dampening layer 136 may be attached to the top surface 120A of the attachment plate 120. When the strut 114 is attached to the board 102, as described above, the vibration dampening layer 136 is positioned between the board 102 and the strut 114. The vibration dampening layer 136 may be formed of an elastomeric material (e.g., rubber) to dampen or filter vibrations or noise. For example, the propulsion unit 106 may cause noise or vibrations that extend along the strut 114 to the board 102. The board 102 may amplify these noises and vibrations similar to the body of an acoustic guitar, creating a noisy riding experience. By including the vibration dampening layer 136, these noises and vibrations can be reduced or eliminated at the interface of the strut 114 and the board 102. The material and thickness of the vibration dampening layer 136 may be selected to filter out specific frequencies of vibrations known to travel along the strut 114.

Figure 1E:
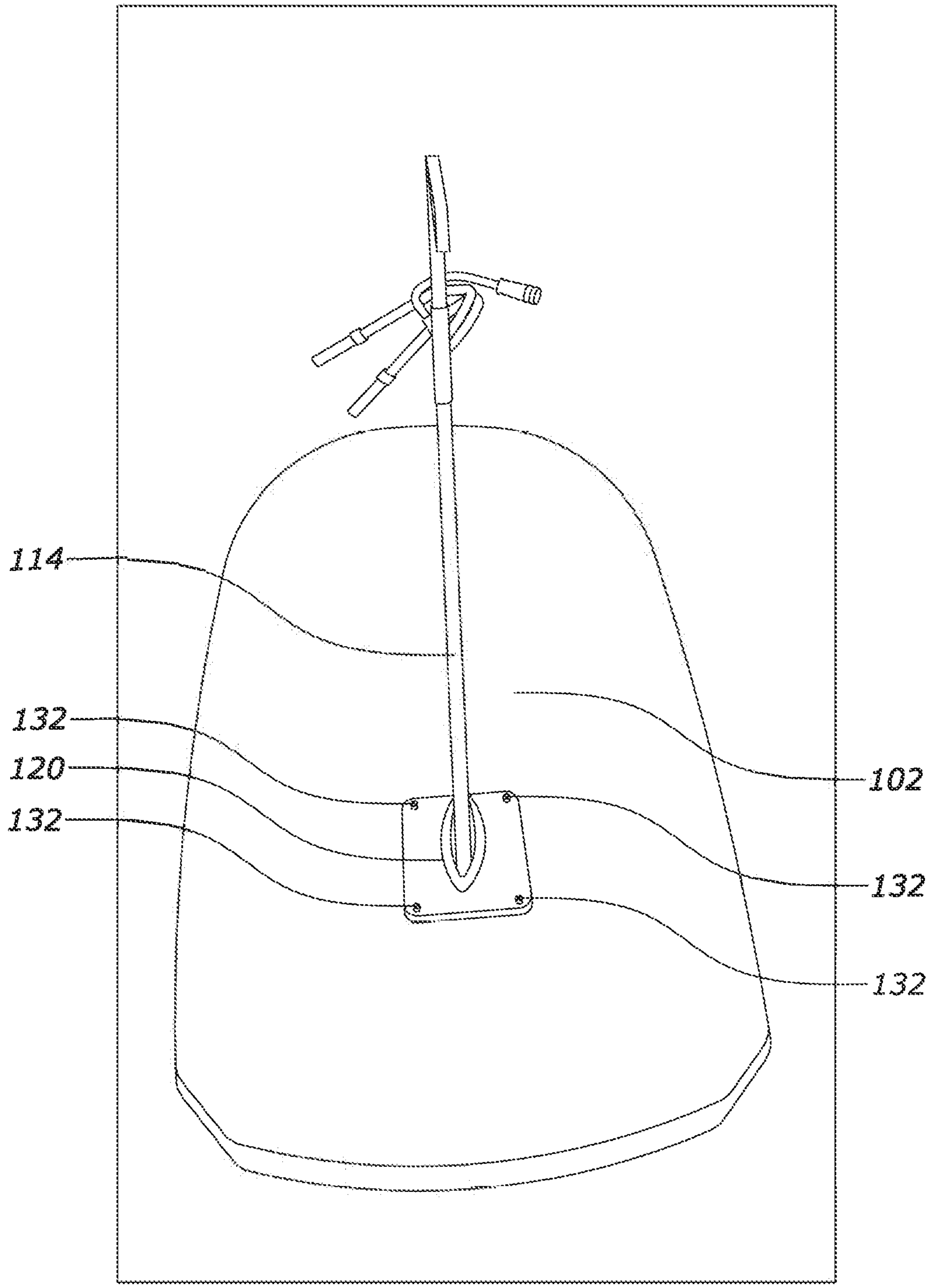
FIG. 1E is a bottom rear perspective view of the hydrofoiling watercraft of FIG. 1A with the strut attached to the board.

FIG. 1E shows the strut 114 attached to the bottom surface of the board 102. Screws 132 secure the strut to the board such that the attachment plate 120 is securely held to the board, holding the strut 114 in substantially fixed relation with the board 102.

In one embodiment, the strut 114 is formed of an upper member and a lower member that are connected by a spring, e.g., in a telescoping configuration. This enables the upper member and lower members of the strut 114 to move relative to one another along the length of the strut 114, for instance when the rider jumps or pumps the board 102. By including a spring in the strut, a rider may somewhat rhythmically shift their weight upward and downward relative to the board 102 to induce foil pumping.

Figure 2:
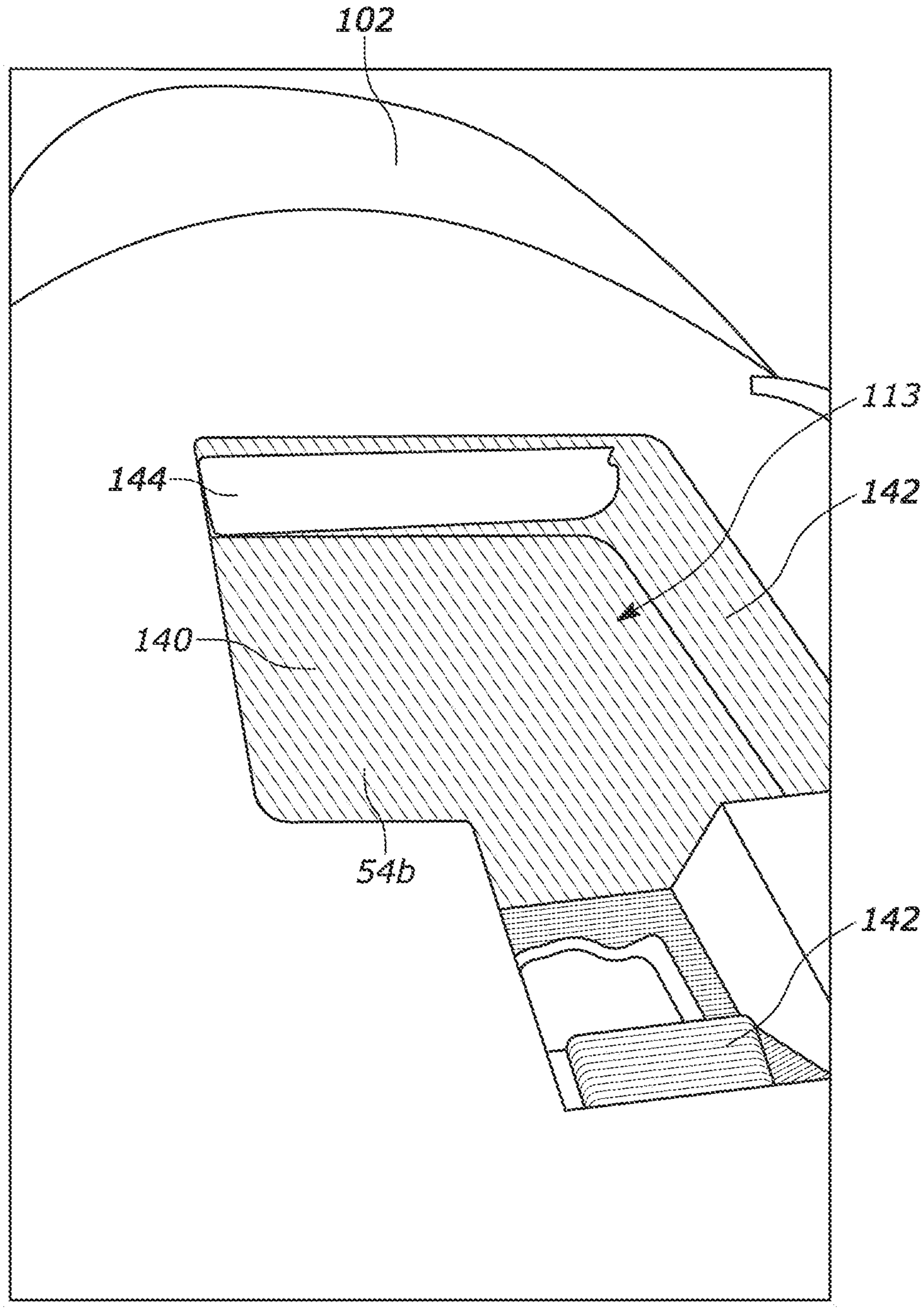
FIG. 2 is a top rear perspective view of a cavity in a top surface of the board of the hydrofoiling watercraft of FIG. 1A.

With respect to FIG. 2, the board 102 may be formed of a combination of non-conductive materials (e.g., glass fiber) and conductive materials (e.g., carbon fiber) to facilitate improved communication via radio frequency transmissions between the watercraft 100, remote controller 200, and other remote devices. As shown, the base 140 and side and rear portion 142 of the cavity 113 in the top surface of the board 102 may be formed of a conductive material (e.g., carbon fiber) or be lined with a conductive layer (e.g., a metal or carbon fiber). Because the material is electrically conductive, the material at least partially blocks electromagnetic waves coming from below the board 102, e.g., those generated from the propulsion unit 106 or motor. This aids to prevent or to reduce the interference caused by the stray electrical noise generated by the propulsion unit 106 or motor.

The front wall 144 of the cavity 113 of the board 102 may be formed of a non-conductive material (e.g., glass fiber) that allows electrical signals such as radio frequency communications to pass through. This allows the communication circuitry of the watercraft 110 to communicate with the remote devices, including, as examples, a wireless controller 200 or a server computer through the portion of the board 102 formed of non-conductive material. This improves communication of the watercraft 100 and/or remote controller 200 via radio frequencies because the front portion of the board 102 and the front wall 144 remain out of the water even when the board 102 is stationary. For instance, when the rider is on the board 102 in the water, but not moving, the rear portion of the board 102 may be submerged in the water. The water, especially saltwater, may interfere with or block the radio frequency communications with the watercraft 100. By having the front wall 144 of the cavity 113, that remains above the water even when stationary, formed of a non-conductive material, the quality and reliability of the radio frequency communications are improved. This is due in part to there being no conductive or radio frequency blocking barriers (e.g., carbon fiber, water) between the communication circuitry of the watercraft 100 and the air.

Figure 3:
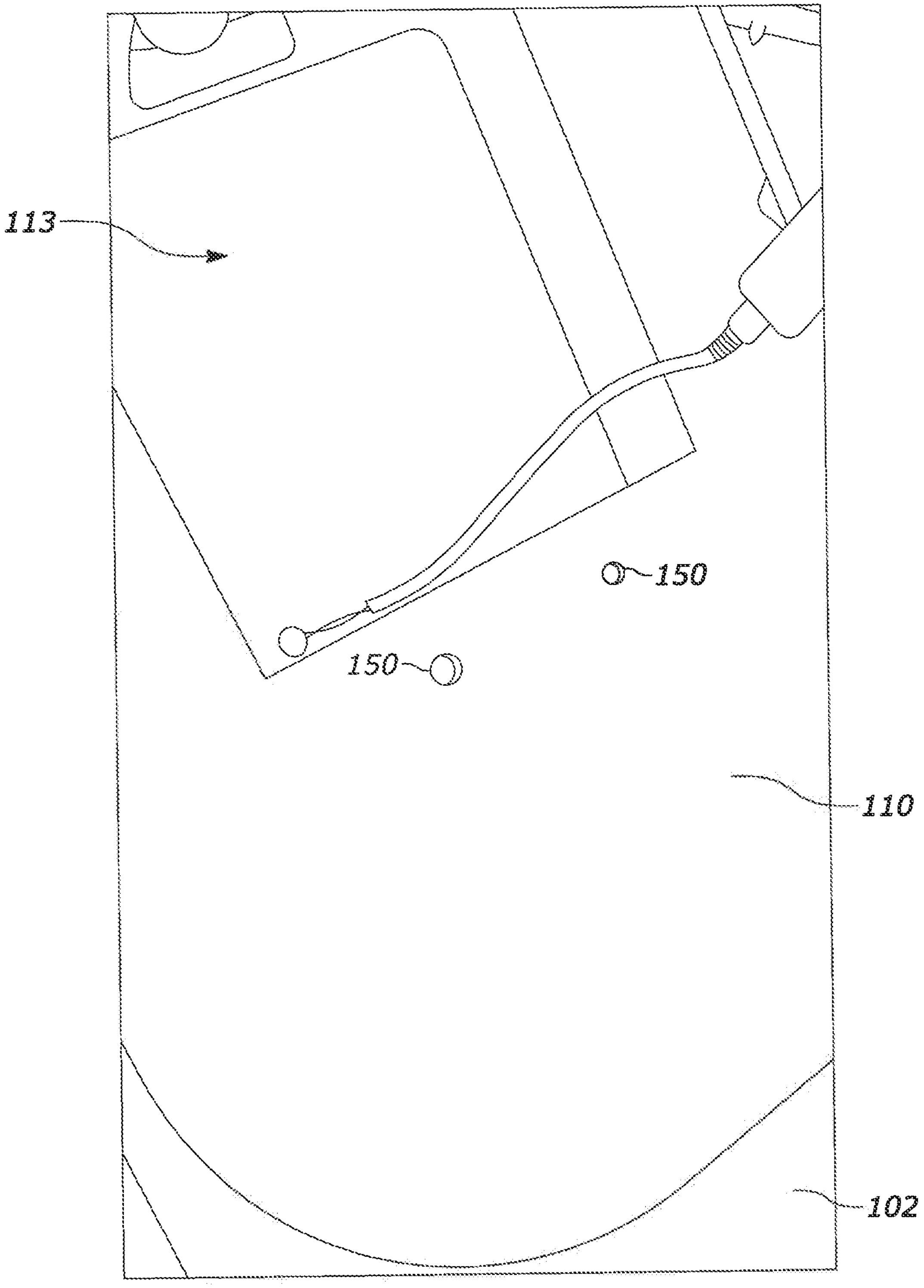
FIG. 3 is a top perspective view of a portion of the top surface of the board of the hydrofoiling watercraft of FIG. 1A.

With respect to FIG. 3, the board 102 may include vents 150 for equalizing the pressure between the cavity in the interior of the board 102 and the ambient pressure. The vents 150 may include a gas permeable membrane (e.g., Gore material) that is permeable to air and other gases, but that is impermeable to fluids such as water. This vent 150 may serve to prevent damage or deformation that could result due to a pressure imbalance between the inner cavity of the board 102 and the outside. For instance, the heat of the sun may cause the air within the board 102 to expand which may cause a portion of the board 102 to bubble or deform.

Figure 4A:
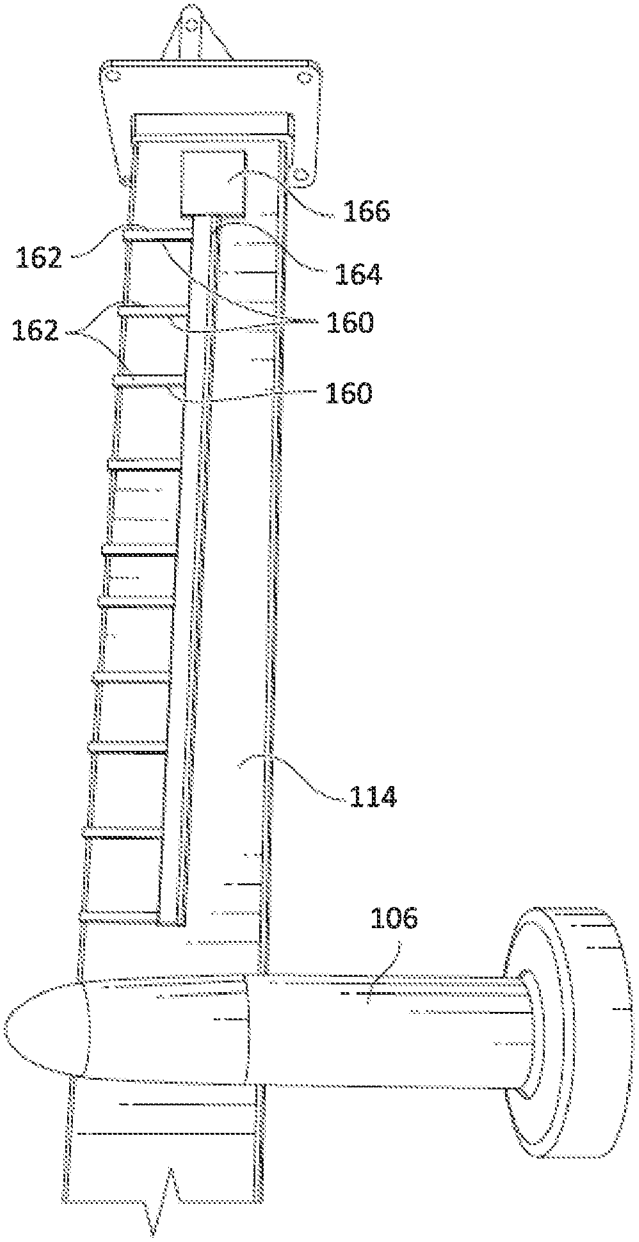
FIG. 4A is a side view of the strut of the watercraft of FIG. 1A including pressure tubes for monitoring the ride height of the watercraft.

With respect to FIGS. 4A-D, various embodiments are provided for determining the ride height of the watercraft 100, i.e., the distance the board 102 is above the surface of the water when the watercraft 100 is operating in the foiling mode. With reference to FIG. 4A, the ride height of the watercraft 100 may be determined via a plurality of pressure tubes 160 disposed along the height of the strut 114. One end 162 of the pressure tube 160 may be positioned at the outer surface of the strut 114. The pressure tube 160 may extend through the interior of the strut or along the exterior surface of the strut 114 to the other end 164 that is coupled to a sensor 166 that monitors the pressure within the pressure tubes 160. When a pressure tube 160 transitions from being above the surface of the water or below the surface of the water, the pressure change within the tube is detected and monitored. By knowing which sensors 166 are monitoring which pressure tubes 160, and where the ends 162 of the pressure tubes 160 terminate along the height of the strut 114, the height of the board 102 above the surface of the water may be estimated. Additionally, the ends 162 of the pressure tubes 160 that are underwater may have different pressure readings that correspond with the depth of each pressure tube 160 within the water. Based on these pressure readings, the ride height of the watercraft 100 may be calculated. In some forms, the sensor 166 may be housed within the propulsion unit 100. In other forms, the sensor is mounted to the strut 304. In still other forms, the sensor 166 is mounted in the board 102 or the battery box 112.

Figure 4B:
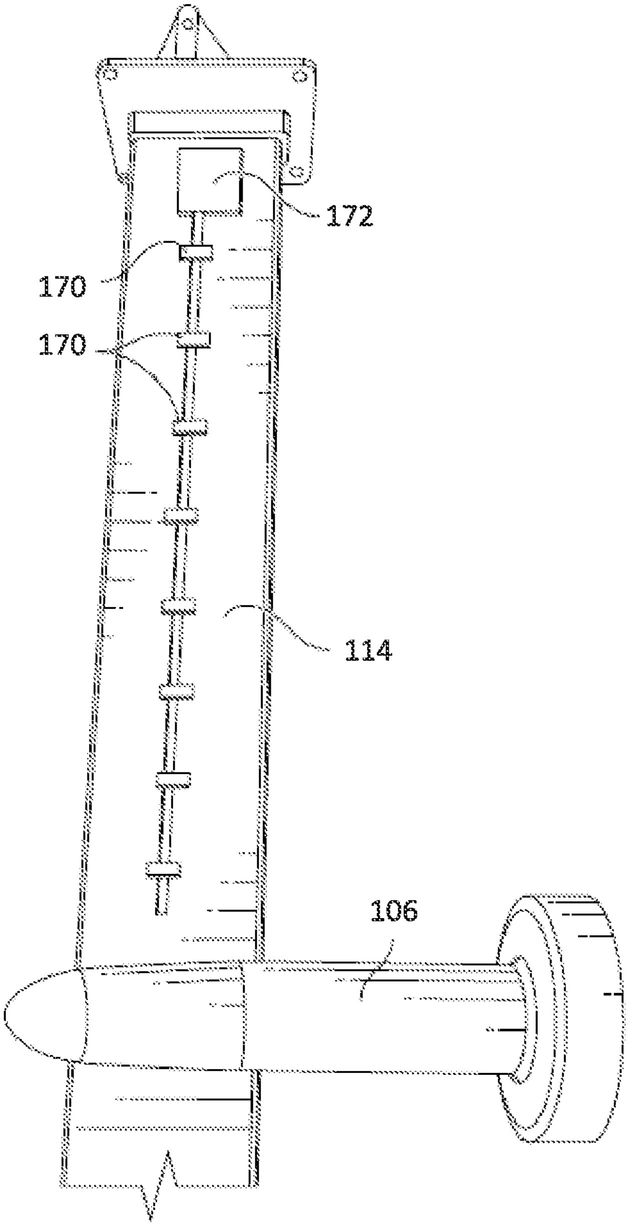
FIG. 4B is a side view of the strut of the watercraft of FIG. 1A including antennas for monitoring the ride height of the watercraft.

In another embodiment, with reference to FIG. 4B, the ride height of the watercraft 100 may be determined via a plurality of receivers 170 disposed along the height of the strut 114 in a linear array. A transmitter 172 mounted at the top end of the strut 114 or within the board 102 may output a radio frequency signal to be detected by each of the receivers 170 and communicated to a controller. Each of the receivers 170 may be connected to the controller via a wire 171 that extends from the receiver to the controller. As the ride height of the watercraft fluctuates, some of the receivers 170 will be underwater and some may be above the surface of the water. The receivers 170 underneath the water will not detect the radio frequency signal of the transmitter 172 or the signal will be very weak, especially if the watercraft is operating in saltwater. Thus, knowing the location of the receivers 170 along the strut 114, and knowing which receivers 170 are underwater because they are not receiving the signal output by the transmitter 172, the ride height of the watercraft 100 may be determined. The radio frequency output by the transmitter 172 may be for example, in the range of 1 kHz to 10 GHz. A higher frequency signal may be used to decrease the propagation of the signal through the water, to ensure that receivers 170 do not receive the signal when under the surface of the water. In other embodiments, a linear array of a plurality of transmitters 172 may be transmitting a radio frequency signal to be detected by a receiver 170 mounted at the top end of the strut or within the board 102. Based on the signals the receiver 170 detects from the transmitters 172, the ride height of the watercraft 100 may similarly be determined.

Figure 4C:
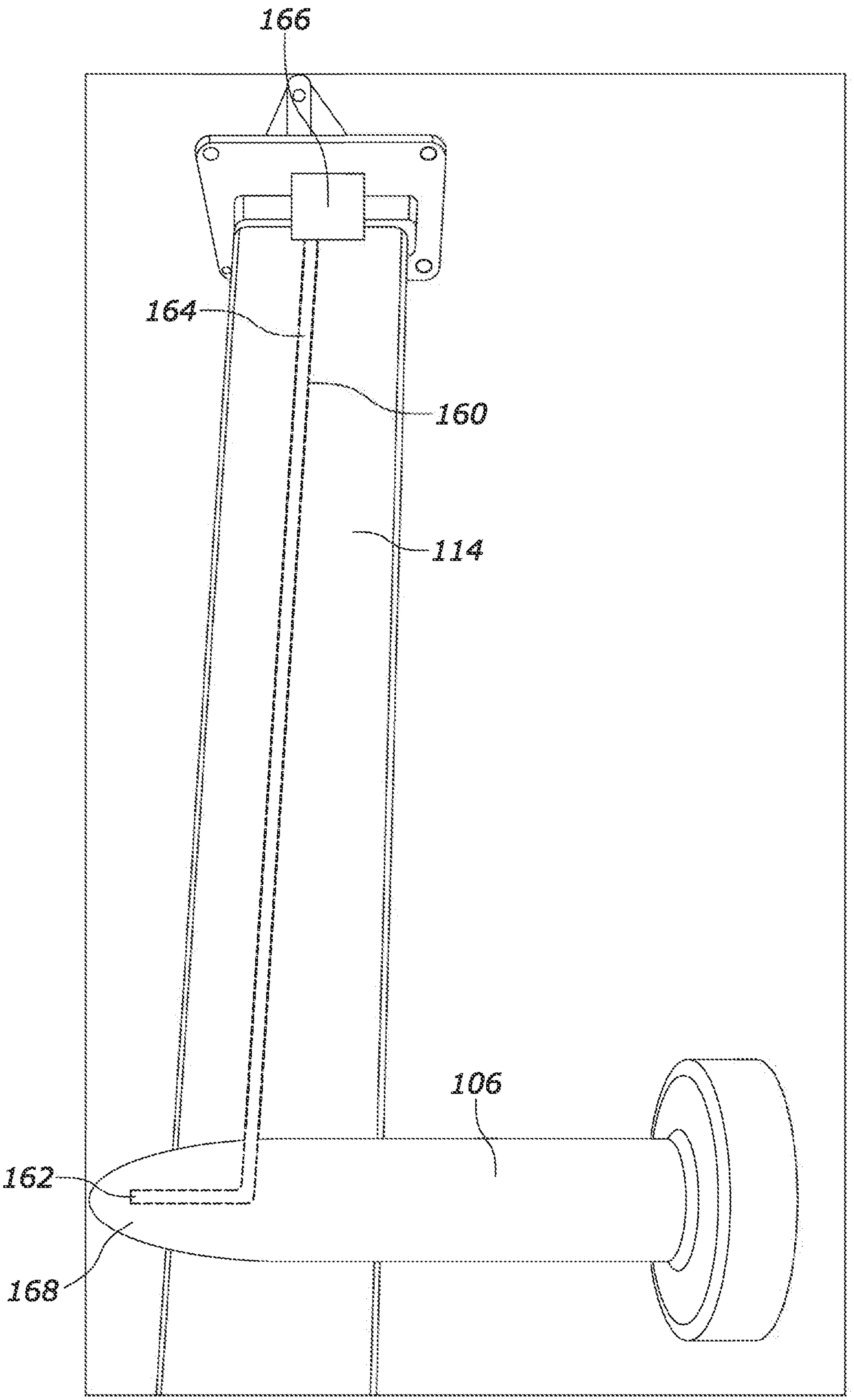
FIG. 4C is a side view of the strut of the watercraft of FIG. 1A including a pressure tube for monitoring the ride height of the watercraft.

In another embodiment, with respect to FIG. 4C, a single pressure tube 160 may be used. The first end 162 of the pressure tube 160 may be positioned within the nose cone 168 of the propulsion unit 106 or terminate at a point along the strut 114. The second end 164 of the pressure tube 160 may be attached to a pressure sensor 166 that monitors the pressure within the tube 160. The pressure within the tube 160 will vary based on the depth of the first end 162 of the tube 160 within the water. By monitoring the pressure within the tube 160, the depth of tube 160 may be estimated and the ride height of the watercraft 100 calculated using the known distance between the end 162 of the tube 160 and the board 102.

Figure 4D:
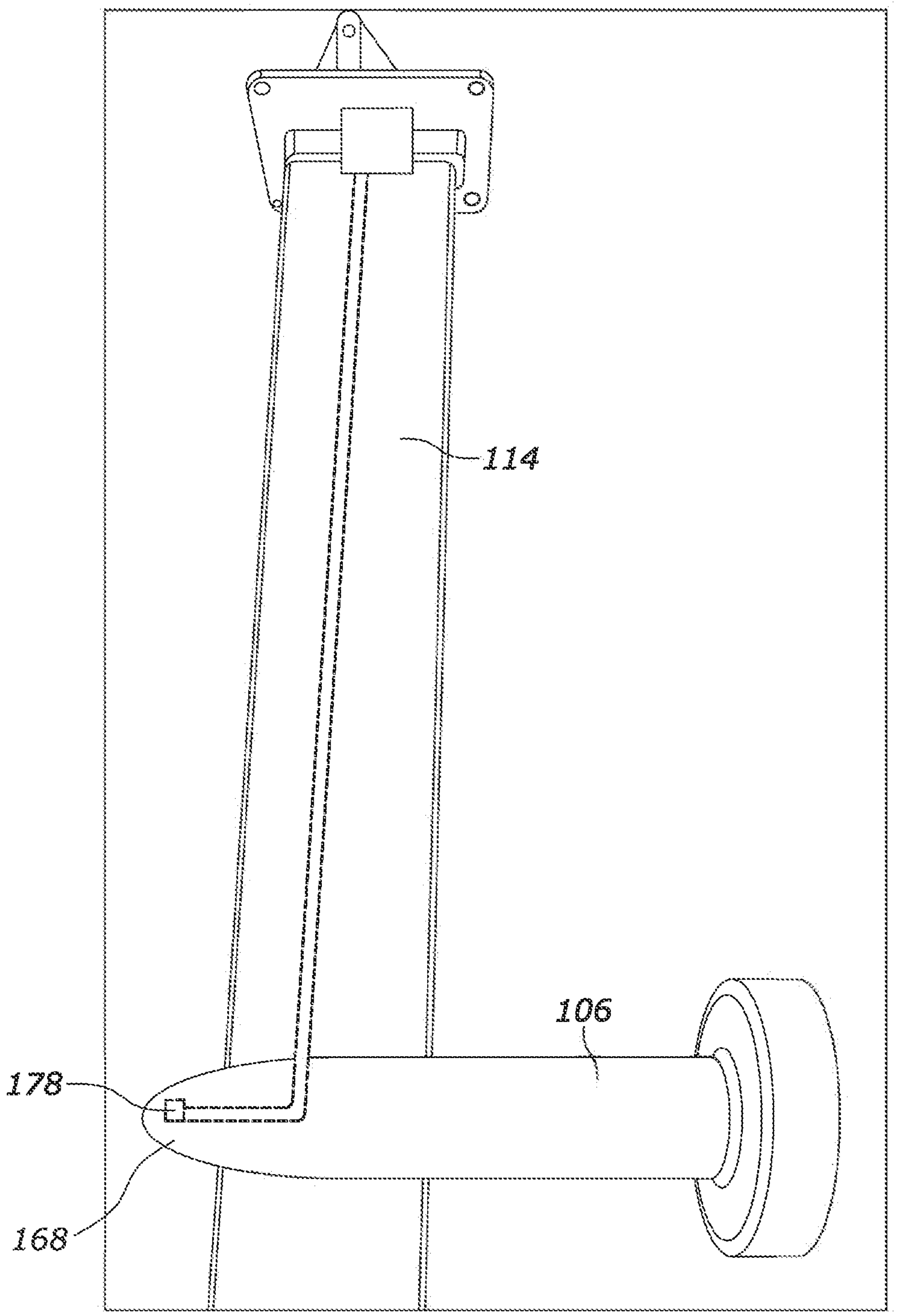
FIG. 4D is a side view of the strut of the watercraft of FIG. 1A including a pressure sensor in a nose cone of the propulsion system.

In another embodiment, with respect to FIG. 4D, an electronic pressure sensor 178 may be positioned within the nose cone 168 of the propulsion unit 106 or at a point along the strut 114. The pressure sensor 178 may be a digital pressure sensor configured to measure the pressure within the water as the height of the watercraft 100 varies during operation of the watercraft 100. The pressure sensor 178 may be connected to a controller of the board 102 (such as a computer within the propulsion pod 106 or the battery box 112) via wires the extend through the nose cone 168, the propulsion unit 160, and/or the strut 114. The pressure sensor 178 may communicate pressure data indicative of the depth of the pressure sensor 178 to the controller. By monitoring the pressure at the pressure sensor 178, the depth of pressure sensor 178 may be estimated and the ride height of the watercraft 100 calculated using the known distance between the pressure sensor 178 and the board 102.

Determining the ride height of the watercraft 100 may be useful in embodiments where the watercraft 100 is configured to automatically navigate or transport the rider. For instance, the rider may select to have the watercraft 100 autonomously take the rider to along a route (e.g., a predefined route). The watercraft 100 may adjust the speed of the motor or movable control surface of the watercraft 100 to maintain a certain ride height. For example, a computing device of the watercraft 100 may receive the ride height data from one or more sensors of the watercraft 100 and adjust the speed of the motor and/or the movable control surface(s) to maintain the ride height at a certain distance or within a certain range. The watercraft 100 may also include a sensor to monitor the height of the waves in the water and adjust the ride height to keep the board 102 above the waves. In another embodiment, the rider may select to have the watercraft 100 automatically maintain the board in a foiling mode while the ride steers the watercraft 100 (e.g., via weight shifting). The rider may, for example, select to have the watercraft 100 automatically maintain the board 102 in a foiling mode via the wireless controller 200. In some forms, the rider may select a ride height for the watercraft 100 to automatically maintain. In other forms, the rider may select a ride height that the user does not desire to exceed. The watercraft 100 may automatically adjust the speed of the motor and/or the movable control surfaces to prevent the user from exceeding the selected ride height.

In one embodiment, the watercraft 100 and/or the wireless controller 200 includes a microphone into which a rider may speak commands. For instance, the rider may speak a command to move forward, turn to the left, turn to the right, increase or decrease the ride height, accelerate, decelerate, stop, and/or travel at a certain speed.

In some embodiments, the watercraft 100 may be controlled by the rider shifting their weight on the surface of the board 102. The board 102 may include weight and/or pressure sensors on the top surface of the board 102 to detect where the rider is placing their weight and how much weight the rider has placed on a certain area of the board 102. The rider may lean their weight forward to increase the speed of the watercraft 100, shift their weight backward or remove their weight from the front of the board 102 to decrease the speed, lean left to steer left, and lean right to steer right. Based on the weight shift or differential across the pressure sensors of the board 102, the watercraft 100 may determine how to operate the watercraft 100. For example, based on the pressure applied toward the front end of the board 102, the watercraft 100 may operate the motor at a certain speed. The speed may correspond to the detected weight differential between the front and rear portions of the board. The watercraft 100 may adjust a movable control surface of the watercraft (e.g., on the hydrofoil wings 116) to cause the watercraft to turn based on the weight differential between the left and right sides of the board 102. The rate at which the watercraft is turned may correspond to the degree of weight difference detected on the right and left sides of the board 102.

Figure 5:
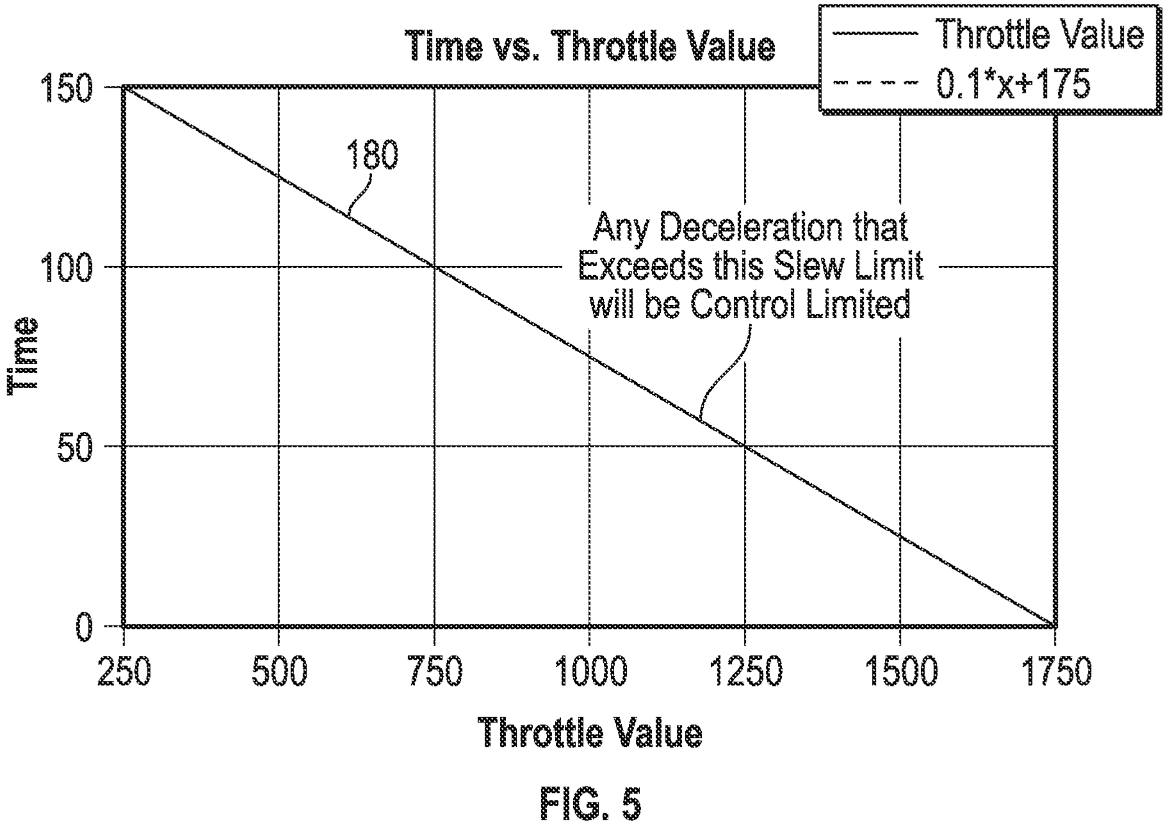
FIG. 5 is a graph indicating an example deceleration limit line permitted by the hydrofoiling watercraft of FIG. 1A according to an embodiment.

The watercraft 100 may be configured to control the rate of deceleration of the watercraft 100 so that the watercraft 100 does not abruptly decelerate (which may cause the rider to fall), but instead has a smooth transition to a slower speed or to a stop. For example, when the rider releases the throttle, the IPU may be configured to continue rotating the propeller at progressively decreasing speeds to lower the rate of deceleration. Using this approach, the rider experiences a smooth transition toward a slower speed without the watercraft 100 jerking in response to the rider easing up on the throttle. The watercraft 100 thus provides an artificial glide to the watercraft 100 when the user disengages or reduces the throttle control value. With reference to FIG. 5, and example graph is provided showing an example slew limit line 180 that may be used to control the rate of deceleration based on the throttle values provided from the throttle controller of a remote controller 200. If the throttle values received from the rider's controller decrease a rate that is steeper than the slope of the slew limit line 180, then the IPU or motor controller will increase the throttle value provided to the motor to ensure that the motor of the watercraft 100 does slow at a rate slower than the slew limit line 180. The ensures that the watercraft 100 does not slow abruptly, but rather slows at a rate no greater than the slew limit line 180.

The watercraft 100 may include sensor for determining whether a rider is still on the board 102 or has fallen off. In one example, the sensor is a pressure sensor similar to those used for detecting weight shift control. In another example, the sensor is a radar or ultrasonic sensor directed upward from the board 102. Using a radar or ultrasonic sensor may aid to ensure that the user has actually fallen of the board 102 and has not simply jumped off of the surface of the board 102, since the sensors may determine if the rider is still above the surface of the board 102, even if not currently contacting the board 102. Use of radar or ultrasonic sensors may result in a faster determination that the rider has fallen as compared to pressure sensors since the sensors can detect immediately when the rider is not above the board 102. In the pressure sensor approach, there may be a delay from the time the rider is not detected on the board 102 to ensure that the rider has not simply jumped and will be returning to the board 102 momentarily. In another form, a magleash may be used. One end of the magleash may be affixed to the rider while the other end includes a magnet that is magnetically coupled to a sensor on the board 102. As the rider falls, the magleash pulls the magnet from the board 102. The watercraft 100 may determine the rider has fallen when the sensor does not detect the magnet of the magleash.

The watercraft 100 may further include an inertial measurement unit (IMU) that detects how far the watercraft 100 has tilted. The IMU may be within the strut 114, battery box 112 or board 102 as examples. The angle of the board 102 relative to the surface of the water may be monitored to determine whether the rider has fallen off of the board. For example, if the board 102 tips more than 45 degrees from the vertical, the watercraft 100 may determine that the rider has fallen off and stop the motor.

The IMU may also be used to determine whether the rider is on the board 102 by monitoring the acceleration of the watercraft 100. For example, when the rider is on the board 102, the acceleration (e.g., bouncing due to a wave) of the watercraft 100 has acceleration characteristics that correspond to the total mass of the watercraft 100 and the rider. When the rider has fallen off the board 102, the acceleration of the watercraft 100 has acceleration characteristics that correspond to only the mass of the watercraft 100, i.e., a significantly lower mass. Thus, when the IMU detects acceleration characteristics corresponding to a mass of only the watercraft and not the rider, the IMU may determine that the rider is not on the board and may have fallen off.

The watercraft 100 may be configured to only slow the watercraft or motor at the set rate of maximum deceleration only if it determined that the rider is still on the board 102 based on the sensors. If it is determined that the rider has fallen off the board 102, then the IPU or motor controller may immediately cut the power provided to the motor to stop the motor from spinning the propeller. Under this approach, the motor will not continue to power the propeller after the rider is in the water and potentially in proximity to the propeller. The propeller may be a foldable propeller such that the propeller folds when the motor is not spinning or the user has let off the throttle. In some forms, the propeller folds when the watercraft 100 detects that the rider has fallen or is no longer on the board 102.

Similarly, the rate of acceleration may be limited to prevent the watercraft 100 from accelerating or decelerating too quickly. In some forms, the rider may select or adjust the acceleration and deceleration rate limits via the wireless controller 200. In other forms, these acceleration and deceleration rate limits may be selected or set via an application on a user device (e.g., a smartphone) that is in wireless communication with the watercraft 100, for example, via Bluetooth. Other operational parameters and limits may similarly be set. For example, the watercraft 100 may be configured to set the top speed and or limit the torque output of the motor. The rate at which the watercraft 100 turns via the movable control surface may also be similarly limited.

Figure 6A:
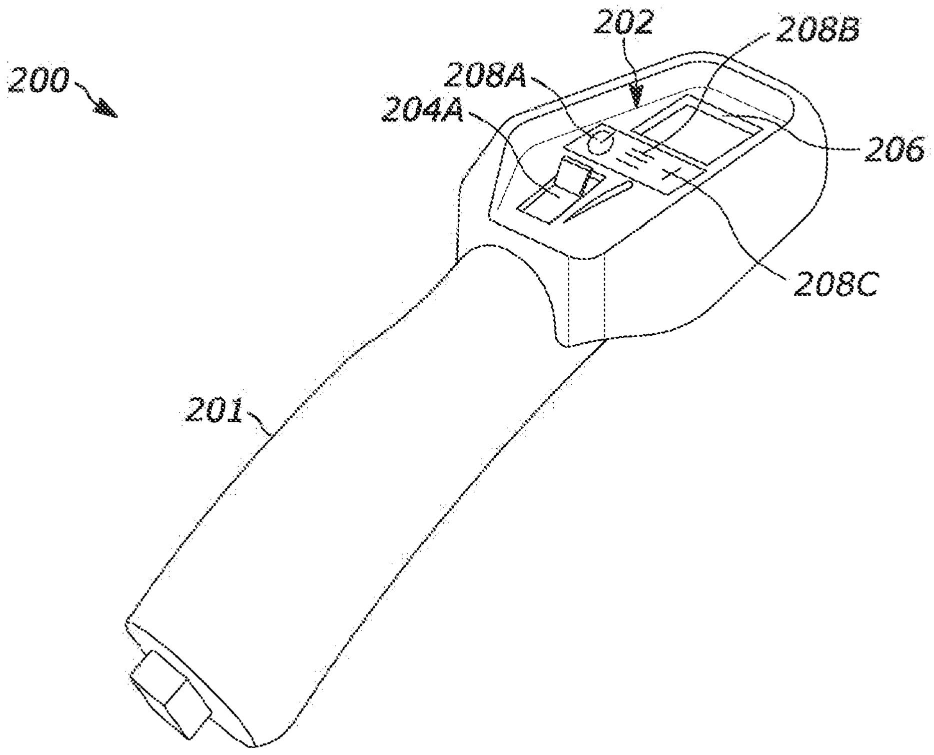
FIG. 6A is a top rear perspective view of a wireless controller for controlling the operation of the hydrofoiling watercraft of FIG. 1A according to a first embodiment.
Figure 6B:
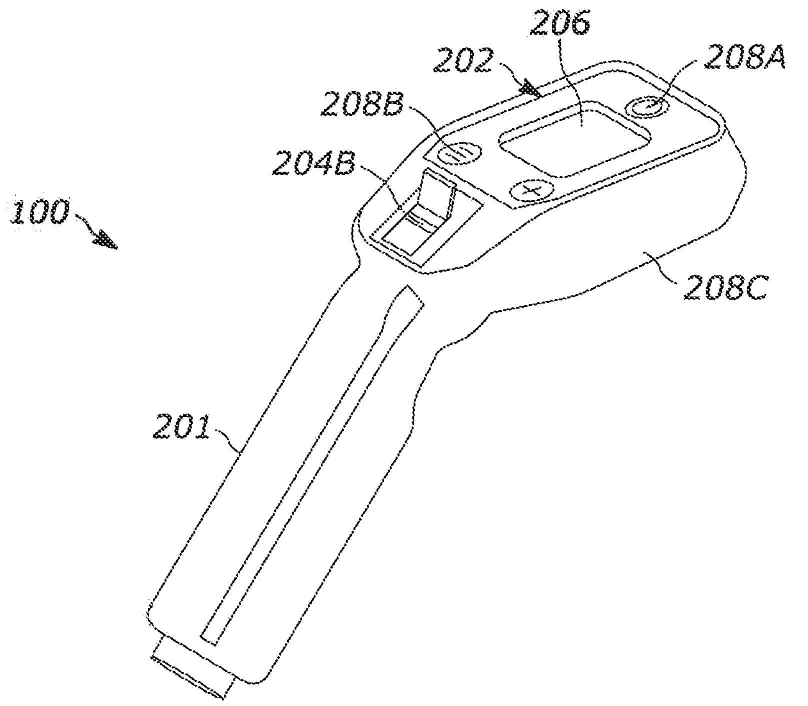
FIG. 6B is a top rear perspective view of a wireless controller for controlling the operation of the hydrofoiling watercraft of FIG. 1A according to a second embodiment.

With reference to FIGS. 6A and 6B, first and second embodiments of wireless remote controllers 200 are shown, respectively. These embodiments operate similarly, with various differences between the embodiments highlighted in the following discussion. The wireless remote controller 200 is a waterproof remote controller that that may include a processor, memory, communication circuitry, user interface 202, a throttle control mechanism 204 (e.g., 204A and 204B), and a battery powering the wireless remote controller 200. The remote controller 200 includes a handle 201 configured to be gripped or held within a rider's hand. The processor, memory, communication circuitry, and battery may be contained within a sealed watertight cavity of the remote controller 200. This wireless remote controller 200 may be communicatively coupled with the communication circuitry of the watercraft 100. The processor of the wireless remote controller 200 may communicate with the watercraft 100 via the communication circuitry. The wireless controller 200 may communicate via one or more of Wi-Fi, Cellular, Bluetooth, Zigbee and the like. The processor is in communication with the user interface 202 and the throttle controller 204 (e.g., 204A and 204B) and configured to receive input from the rider via the user interface 202 and the throttle controller 204.

The throttle control mechanism 204A of the first embodiment of FIGS. 6A and 204B of the second embodiment in FIG. 6B is a thumb wheel. The user rests their thumb on the thumb wheel 204A or 204B and rotates the wheel forward or backward with their thumb to control the throttle of the watercraft 200. Using a thumb control is advantageous over controllers that use a trigger to control the throttle because a user's hand is not as easily fatigued as with trigger control mechanisms. Further, a user's thumb is more likely to come off the thumb wheel when falling of the board 102 as opposed to trigger controllers where a user is prone to squeezing the trigger during a fall causing unwanted throttle control signals.

In preferred embodiments, the thumbwheel position is sensed by a 3D magnetic sensor (hall effect). This allows the magnet sensor to detect rotation and/or translation of the magnetic field from the magnets mounted in the thumbwheel (or a joystick). The use of 3D sensors allows actuation of additional features as the thumbwheel is slid to the left/right, for example to change motor response profiles to simulate "gear shifting." An indicator spring mechanism is preferably used to re-center the control mechanism 204. The use of a 3D hall effect sensor also allows detection of false signals arising from stray magnetic fields (random magnets present near the controller). For example, a safety cutoff leash or other magnetic may be used with the watercraft, or other magnetic fields may be present in the environment.

The processor of the wireless remote controller 200 may receive the throttle control input from the rider via the throttle control input mechanism 204 (e.g., 204A and 204B) and communicate the throttle control information to the watercraft 100 via the communication circuitry.

In some embodiments, the remote controller 200 includes a button that causes the watercraft 100 to "shift gears." The rider may operate the watercraft 100 in a first mode where the watercraft 100 has a limited amount of power/speed, then select the button to transition to a second mode where the watercraft 100 has an increased amount of power/speed. The rider may have three, four, or more modes that unlock progressively more power/speed. As one example, in the first mode, moving the throttle to a full throttle position allows the watercraft 100 to travel at about 10 knots. By switching to the second mode, movement of the throttle to the full throttle position allows the watercraft 100 to travel up to 20 knots. Those having skill in the art will readily appreciate that the speed within each mode may be adjusted and that more modes may be used, with each mode having a maximum amount of power/speed at which the watercraft 100 will operate. The user may select the button to "shift up" to the next mode to unlock a greater amount of power/speed to be selected using the thumb wheel. The remote controller 200 may similarly include a button for "shifting down" to the lower power/speed mode.

Figure 6C:
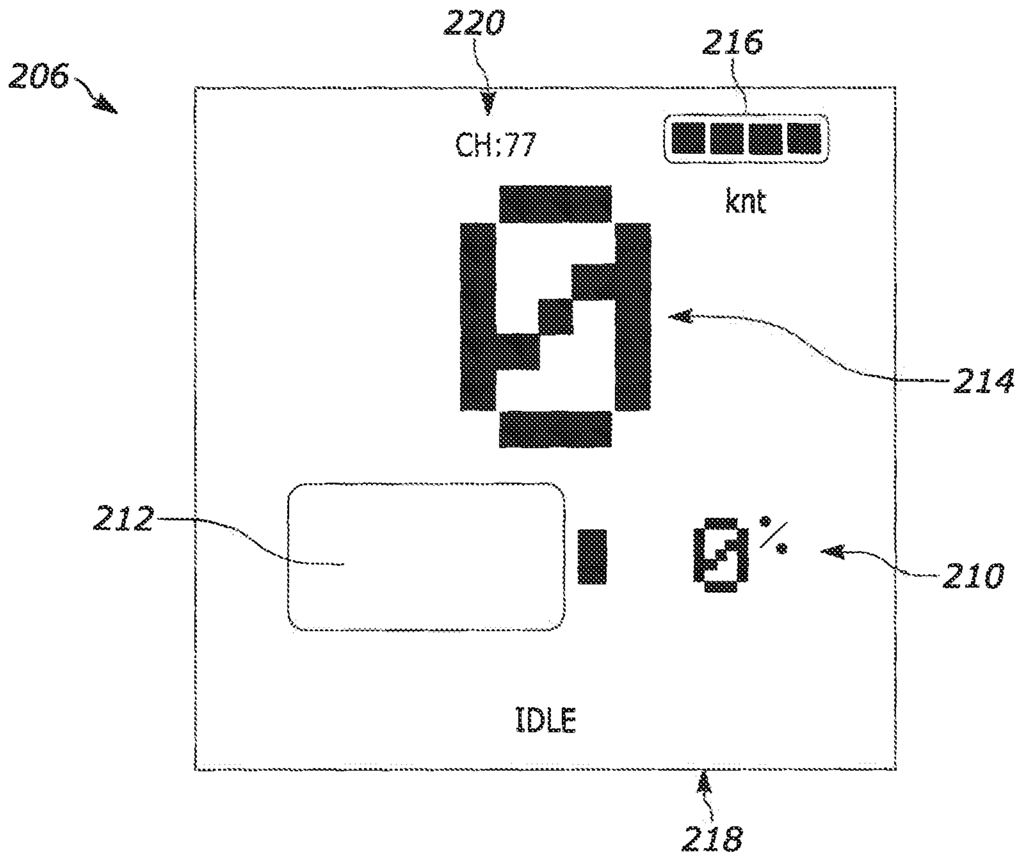
FIG. 6C is an example display of the wireless controllers of FIGS. 6A and 6B.

The user interface 202 may include a display screen 206, one or more buttons 208, a speaker, a microphone, and one or more indicator lights. With reference to FIG. 6C, an example display of the display screen 206 is shown. The display screen 206 may indicate a battery charge percentage 210 of the watercraft 100, a battery charge level graphic 212 of the watercraft 100, the speed 214 of the watercraft 100, the battery charge level 216 of the wireless remote 200, the ride mode 218 of the watercraft 100 (discussed below), and the communication channel 220 the wireless controller is operating on. The wireless remote controllers 200 include buttons 208A-C. Button 208A turns the wireless remote controller 200 on/off. Button 208B causes a menu to be displayed or hid. The user may navigate through the menu to change various settings of the watercraft 100 including the ride mode, adjust an operating parameter of the watercraft 100 (e.g., adjust the deceleration or speed limit), etc. Button 208C is a select button used to select the item displayed on the screen.

The wireless remote controller 200 may include a plurality of profiles or ride modes that are selected to control the operation of the watercraft 100. For instance, a new user may start at a beginner level where the watercraft is limited to lower speed and rates of acceleration. After a period of time, the user may progress through an intermediate, advanced, and expert levels unlocking increasingly more power, higher speeds, rates of acceleration. Additional features may also be unlocked including a wave-riding mode and a reverse mode. In some forms, the watercraft may assist the rider (e.g., provide stability to the board 102 via movable control surfaces) in the lower levels and progressively provide less and less assistance as the user gains more experience.

In some embodiments, the riders usage and performance data is collected by the watercraft (e.g., the IPU) and/or wireless controller 200. The rider's usage and performance data (e.g., time of use, number of falls, etc.) may be uploaded to a cloud for storage and analysis. A determination of the appropriate ride mode for the rider may be determined based on the rider analysis. The rider may have a profile associated with a smartphone application that enables the user to transfer their rider profile information between different watercraft 100 so that the unlocked ride modes and features are available to that rider on other watercraft 100. The rider profile may include biometric information of the rider including their height, weight, image of their face for facial recognition of a user to authenticate the user, login information, ride style data, and ride height data. The watercraft 100, remote controller 200, and/or cloud may be used to automatically identify and track riders based on their unique rider characteristics.

In the embodiment shown, the remote controller 200 includes an idle mode, lock mode, easy mode, intermediate mode, and advanced mode. In the idle mode, the throttle cannot be applied. This is the default mode of the remote controller 200 on startup. The remote controller 200 may also revert to this mode from any normal ride mode as a failsafe if the user does not provide throttle input after 30 seconds. In the lock mode, the throttle also cannot be applied. This explicitly locks the remote to throttle input for safety around children, pets, or other non-participants on land or water.

The easy mode is for new riders. The easy mode may limit acceleration performance, available power to approximately 60 percent, and top speed to approximately 12 knots or 14 mph. The intermediate mode is for riders proficient in falling. The intermediate mode has higher acceleration performance, limits power to approximately 70 percent, and top speed to approximately 16 knots or 18 mph. The advanced mode is for experienced riders. The advanced mode provides unrestricted acceleration performance and has no limits on power, producing a top speed in excess of 20 knots or 23 mph.

The remote controller 200 may include a pressure sensor that indicates when the remote controller 200 is underwater. The remote controller 200 may stop sending a throttle control signal upon detecting the remote controller 200 is underwater. The remote controller 200 may be underwater when, for example, the rider falls off of the board 102. Thus, by ceasing to transmit a throttle control signal, the motor of the watercraft 100 may be shut off automatically when the rider falls in the water. When the watercraft 100 ceases to receive the throttle control signal from the remote controller 200, the IPU may immediately cease to provide power to the propulsion unit 106, thus causing the propeller to cease rotating. The IPU may be configured to disregard the deceleration limits that may be selected or set to disable the motor if the rider falls overboard.

In some embodiments, the remote controller 200 may include a reed switch or a magnetic sensor that is used to activate the ride mode. For example, the rider may bring a portion of the remote controller 200 into contact with a magnet or contact on the top surface of the board 102. The reed switch or magnetic sensor may detect that the remote controller 200 was brought into contact with the board 102 and switch the remote controller 200 into a ride mode (out of the idle or locked modes). In one example, upon touching the board 102 with the remote controller 200, a countdown is started until the remote controller 200 switches into the ride mode at which point the rider may control the watercraft 100 via the remote controller 200. The ride mode may time out after a period of inactivity. For example, if the user does not engage the throttle control mechanism 204 within 30 seconds, the remote controller 200 may switch back to the idle or locked mode.

In one embodiment, touching the remote controller 200 to the board 102 causes the remote controller 200 and the watercraft 100 to be linked or paired such that the remote controller 200 will send control signals to the watercraft 100 the rider touched the remote controller 200 to. This prevents a user for inadvertently controlling another watercraft 100 with a remote controller 100, which could cause otherwise potentially cause damage to the other watercraft 100 and/or injure someone nearby. The remote controller 200 may unpair or disconnect from the watercraft 100 after a period of inactivity following contact with the board 102. For example, if the user does not engage the throttle control mechanism 204 within 30 seconds, the remote controller 200 may unpair from the watercraft 100. The user will then need to contact the board 102 with the remote controller 200 again to control the watercraft 100.

The remote controller 200 may include a hole 222 for a leash pin or through which a strap or cord may be attached. The strap or cord may be wrapped or loops around a riders wrist or arm to tether the remote controller 200 to the rider. If the rider falls and drops the remote controller 200, the remote controller 200 may remain attached to the rider. In some forms, the remote controller 200 is floats. This may be due in part to the sealed watertight cavity within the controller 200.

In some embodiments, the remote controller 200 is wirelessly tethered to the watercraft 100 so that the remote controller 200 and the watercraft 100 remain linked and in communication with one another. The watercraft 100 may determine the distance that the remote controller 200 is from the watercraft 100 which the watercraft 100 may use in determining whether the rider has fallen off of the watercraft 100. If the remote controller 200 is more than a predetermined distance (e.g., 8 feet) from the watercraft 100, the watercraft 100 may cease operation.

In some embodiments, the remote controller 200 includes a summon feature where the rider can send a signal to the watercraft 100 to cause the watercraft 100 to autonomously operate and move toward the rider. This may be beneficial to the rider when the rider falls off the watercraft 100. The rider then does not have to swim after the watercraft 100 when the rider falls off, but can simply summon the watercraft 100 to return to the rider. The rider may summon the watercraft 100 by pressing a button on and/or speaking a command to the remote controller 200. The watercraft 100 may determine the location of the remote controller 200 and automatically navigate toward the remote controller 200. The location of the remote controller 200 may be determined via the Bluetooth communication with the remote controller 200 to determine the distance the watercraft 100 is from the remote controller 200 and the angle at which the watercraft 100 is approaching the remote controller 200. As another example, the remote controller 200 further includes GNSS circuitry to determine the location of the remote controller 200. The remote controller 200 may communicate its location to the watercraft 100 and the watercraft 100 may navigate toward the remote controller 200. The watercraft 100 may determine its location also using the GNSS circuitry of the watercraft 100. In some forms, the watercraft 100 cannot be summoned when the remote controller 200 is within a certain distance, e.g., 10 feet to reduce the risk of collision between the rider and the watercraft 100. Similarly, when summoned, the watercraft 100 may head toward the user, but cease operating when the remote controller 200 is within a predetermined distance, e.g., 10 feet. This summon feature is particularly beneficial when there is a strong wind or current that could cause the watercraft 100 to get carried away from the rider when the rider falls off.

Figure 7A:
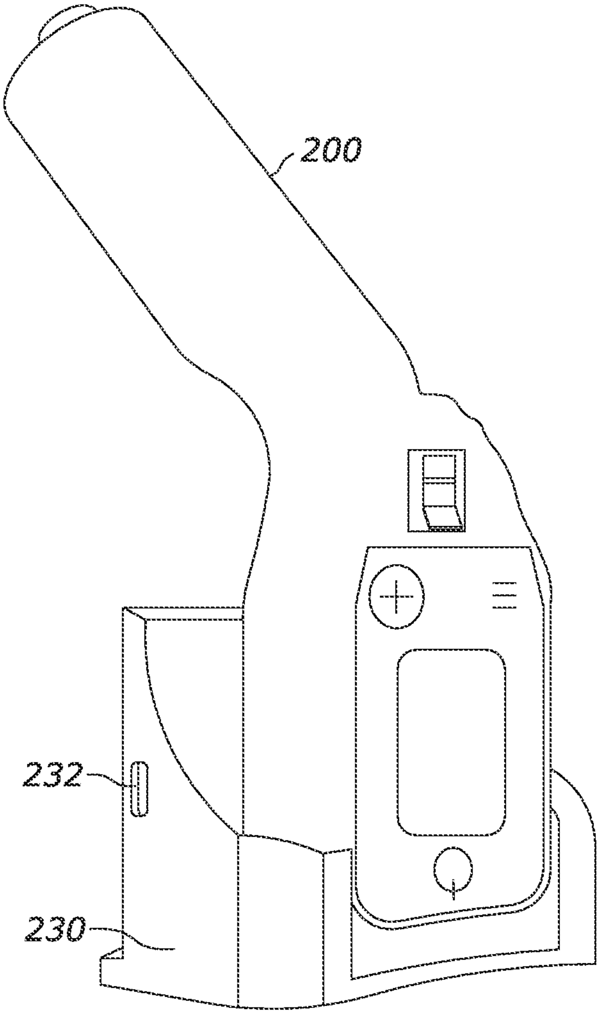
FIG. 7A is perspective view of the wireless controller of FIG. 6B positioned within a wireless charging dock.

With respect to FIG. 7A, the battery of the remote controller 200 may be charged by placing the remote controller 200 on a charging dock 230. The battery of the remote controller 200 may be charged inductively. This enables the battery and other components to remain sealed within the watertight cavity of the remote controller 200 without including any opening for wires to extend across the fluid tight seal. The charging dock 230 may include a port 232 into which a charging cable may be inserted. The charging cable may be plugged into a wall outlet to provide power to the charging dock 230 via the port 230. The charging dock 230 may include a primary coil for charging the remote controller 200. The remote controller 200 may include a secondary coil that is aligned with the primary coil of the charging dock 230 when the remote controller 200 is placed in the charging dock 230 to enable the remote controller 200 to be charged inductively.

Figure 7B:
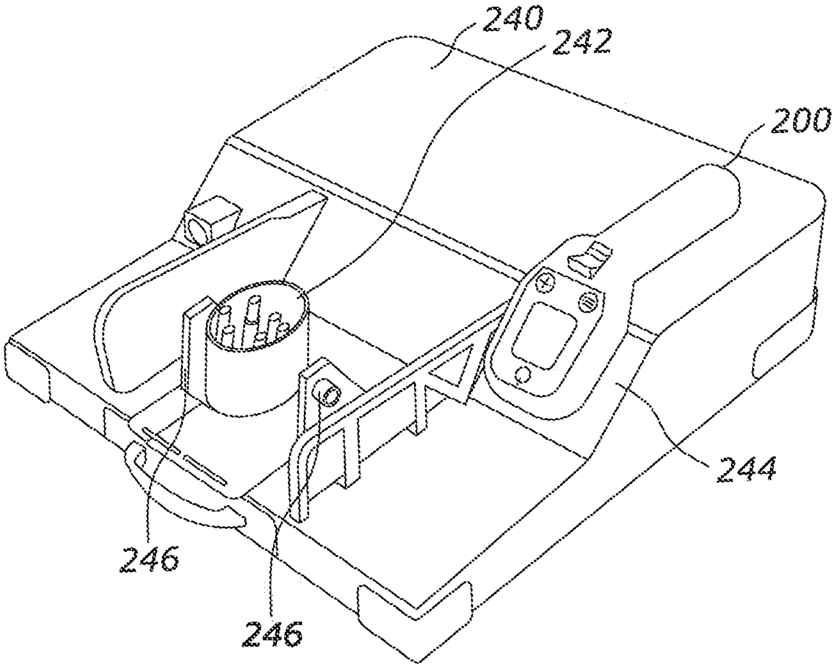
FIG. 7B is a perspective view of an integrated charging station for the wireless controller of FIG. 6A or 6B and a battery of the hydrofoiling watercraft of FIG. 1A.

With respect to FIG. 7B, the battery of the remote controller 200 may be charged on a charging dock 240 of another embodiment. The charging dock 240 includes a connector plug 242 that the battery box 112 of the watercraft 100 may be plugged into for charging the battery box 112. The connector plug 242 may be similar to the connector plug 122 of the strut 114. The charting dock 240 may also include attachment brackets 246 similar to the attachment brackets 124 of the strut 114. Thus, to attach the battery box 112 to the charting dock 240, the battery box 112 may be attached similar to the attachment of the battery box 112 to the strut 112. The remote controller 200 may rest on a portion or a pad 244 of the charging dock 240 to be charged inductively, similar to that described above with regard to FIG. 7A. The charging dock 240 may include a port that a charging cord plugs into. The charging cord may be plugged into a wall outlet to supply power to the charging port 240.

Figure 8A:
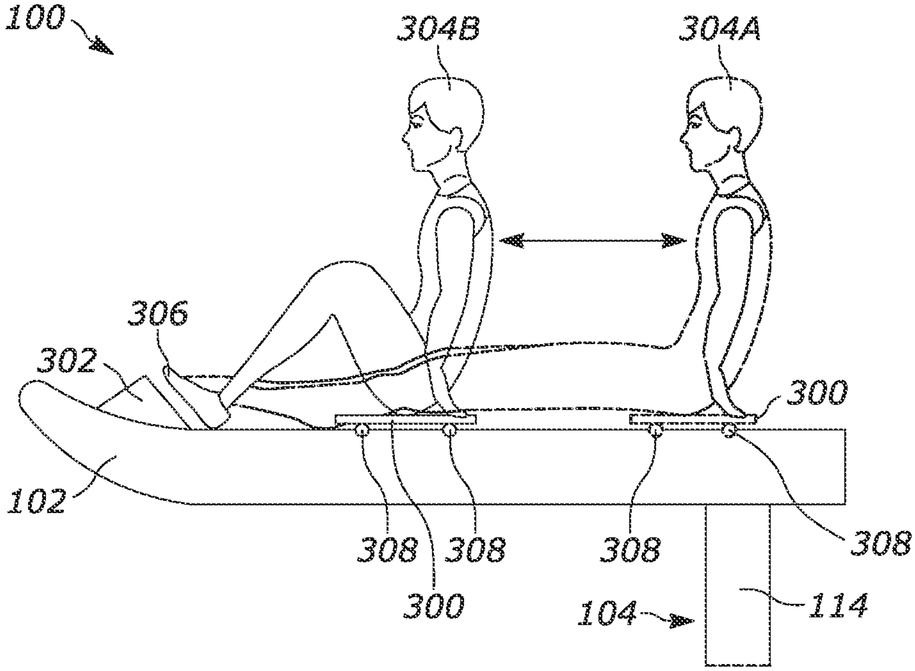
FIG. 8A is a side schematic view of the hydrofoiling watercraft of FIG. 1A including a movable portion according to a first embodiment.
Figure 8B:
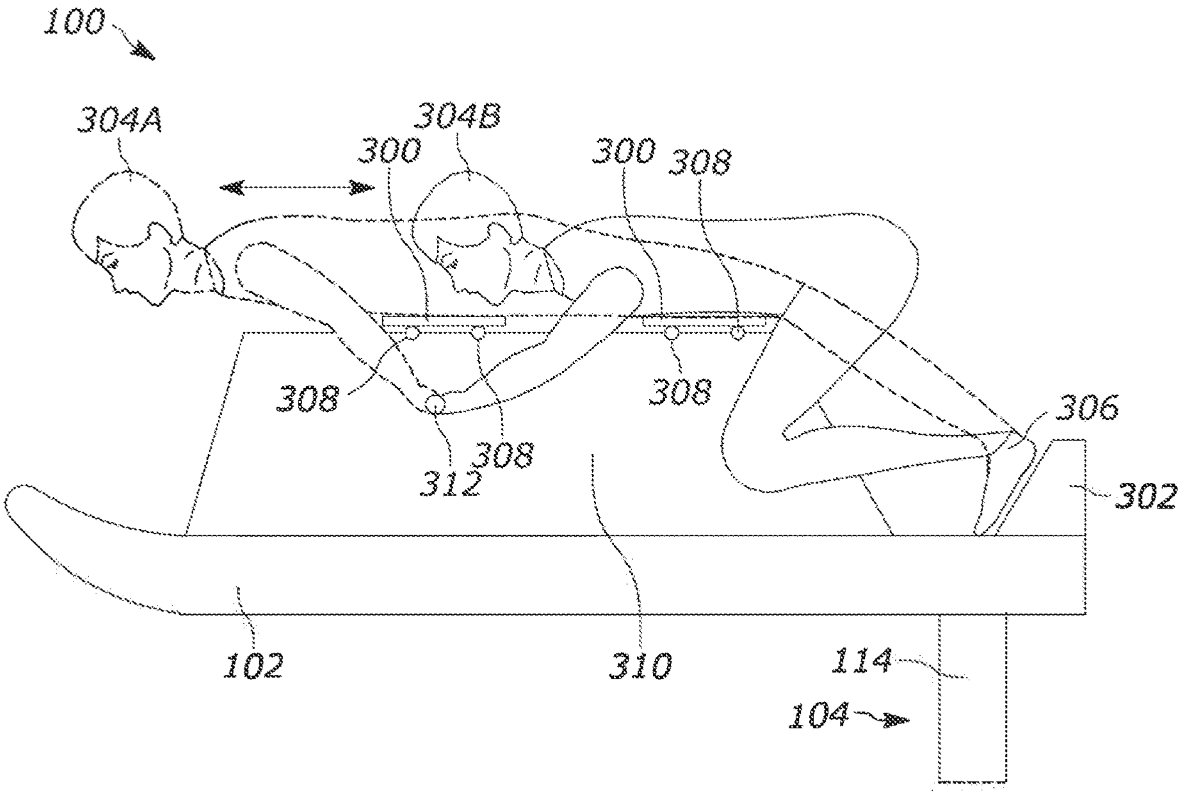
FIG. 8B is a side schematic view of the hydrofoiling watercraft of FIG. 1A including a movable portion according to a second embodiment.

With respect to FIG. 8A-B, the hydrofoiling watercraft 100 is shown according to another embodiment. This hydrofoiling watercraft 100 provides a rider with a sliding plate 300 on the board 102 which the rider can use to slide along the board 102 to shift their weight to adjust the center of gravity of the board and/or to steer the watercraft 100. In each of the embodiments described below, the watercraft 100 includes a fixed portion (e.g., the board, strut) and a movable portion (e.g., a slide pate, seat, saddle) that is able to move relative to fixed portion. The rider may sit, kneel, or lay on the movable portion and place a substantial portion of their weight on the movable portion. The rider may user their arms and/or legs to engage the fixed portion of the watercraft 100 to move the movable portion relative to the fixed portion to shift their weight relative to the fixed portion and adjust the center of gravity of the watercraft 100 during operation of the watercraft. With respect to FIG. 8A, the hydrofoiling watercraft 100 includes the board 102, hydrofoil 104, a sliding plate 300, and a pushing block 302. The sliding plate 300 is the movable portion that is movable relative to other portions of the watercraft 100. In the embodiment shown in FIG. 8A, the sliding plate 300 may serve as a seat on which the rider 304 sits, similar to a rowing seat. The plate 300 may be sized and shaped for a rider 304 to sit on. In some forms, the plate 300 includes padding to reduce the soreness of the rider when sitting on the plate 300 for extended periods of time.

The rider may position their feet 306 to rest against and engage the pushing block 302. As shown in FIG. 8A, the pushing block 302 may be at a front longitudinal end portion of the board 102. The pushing block 302 may include a layer disposed thereon to increase the friction of the foot engagement surface the rider engages with their feet to prevent the rider's feet from slipping. This layer may be formed of rubber or a non-slip grip pad. The position of the pushing block 302 may be adjustable to accommodate riders of varying heights. As shown, the sliding plate 300 may move longitudinally along the board 102 allowing the rider 304 to shift their weight between the front (shown by rider 304B) and rear (shown by rider 304A) of the watercraft 100. For example, the rider 304 may extend their legs as shown by rider 304A, pushing off the pushing block 302 with their feet 306 to slide the sliding plate 300 toward the rear of the board 102. This causes the weight of the rider 304 to shift toward the rear of the board 102 which changes the center of gravity of the watercraft 100 toward the rear of the watercraft 100. To shift their weight toward the front of the board 102, the rider 304 may bend their legs 304 as shown by rider 304B to allow themselves to slide toward the front of the board 102 on the sliding plate 300. In some forms, the board 102 may include a handle the rider 304 may grab to pull themselves forward. By sliding along the length of the board 102, the rider 304 is able to finely and easily adjust the center of gravity of the watercraft 100.

The sliding plate 300 may be a seat on which the rider 304 sits on the watercraft 100. The board 102 may include a track or rails extending along the length of the board 102 that guide the sliding plate 300 as it slides along the board 102. The plate 300 may include wheels or rollers 308 that engage the track or rails of the board 102. The rails may be a channel into which wheels 308 of the sliding plate 300 extend into. The channel may guide the wheels 308 of the sliding plate 300 longitudinally as the plate 300 slides along the board 102. In some embodiments, the sliding plate 300 includes one or more low friction feet or skis on which the sliding plate 300 slides along the channel or a track. The one or more feet or skis may be positioned within the guide channel to guide the sliding plate 300 as it moves along the board 102. In some forms, the rails are below the top surface of the deck 108 and set within the board 102. In the embodiment shown, the plate 300 slides slightly above the surface of the deck 108. In other embodiments, the top surface of the plate 300 may be flush with the deck 108. In yet other embodiments, the plate 300 may be elevated from the deck 108. For example, the plate may be elevated in the range of about two to about 12 inches off the board 102.

In some embodiments, the plate 300 includes two or more sets of wheel assemblies similar to those of a roller coaster. Each wheel assembly includes three wheels that engage a rail of the board 102, such as a rod, bar, or tube. Each wheel assembly may include a top wheel that engages the top side of the rail, a bottom wheel that engages the bottom side of the rail, and a side wheel that engages the inner or outer side of the rail. In still other embodiments, the plate 300 is coupled to a plurality of linear bearings that are configured to slide along the rails of the board 102.

The watercraft 100 may include one or more springs biasing (e.g., pulling) the plate toward the front of the board 102. This keeps tension on the plate 300 so that when the rider desires to shift their weight forward the spring pulls or aids in pulling the rider toward the pushing block 302. Additionally, this aids to ensure that the rider's feet are always engaging the pushing block 302 so that the rider is always able be in control of where their weight is shifted along the board. Thus, to shift their weight forward, a rider may only need to bend their knees and allow the plate 300 to slide forward due to the force of the springs. To slide toward the rear of the watercraft 100, the rider may extend their legs and push off the pushing block 302 to overcome the biasing force of the springs.

In some embodiments, the watercraft 100 includes a locking mechanism to lock the sliding plate 300 to a position on the board 102. For instance, if the rider desires to sit on the plate 300 but does not desire to slide along the length of the board 102, the rider may lock the plate 300 in place relative to the board 102. The locking mechanism may engage the rail, the board 102 or both to lock the plate 300 in place.

In some forms, the sliding plate 300 may have a longitudinal length sized to enable the rider 304 to lay down on the sliding plate 300 to operate the watercraft 100 when desired. The watercraft 100 may include a handle for the rider to grab at the rear and/or front of the watercraft 100 to enable the user to push and/or pull themselves to shift their weight and ride in various alternative positions.

With reference to FIG. 8B, another embodiment of a watercraft 100 having a sliding plate 300 is shown. In this embodiment, the pushing block 302 is at the rear longitudinal end portion of the board 102 as shown in FIG. 8B. The board 102 further includes an elevated platform 310 extending upward from the deck 108 on which the plate 300 slides. The platform 310 may extend upward from the deck 108 about six inches to about 2 feet. The platform 310 may include the rails at the upper end that the sliding plate 300 slides along which may be similar to the rails and sliding assemblies described in detail above. In this embodiment, the rider 304 faces forward positioning their chest on the sliding platform and their feet on the pushing block 302. The platform 310 may include a handle 312 extending laterally from either side or both sides of the elevated platform 310 that a rider 304 may grip with their hands. To shift their weight forward, the rider pushes off the pushing block 302 by extending their legs as shown by rider 304A and/or pulls on the handles to slide their weight forward toward the front end of the watercraft 100. To shift their weight backward, the rider 304 bends their legs as shown by rider 304B and allows their body to slide toward the rear of the watercraft 100 on the sliding plate 300.

The sliding plate 300 may include wheels or linear bearings that slide along rails as described with regard to FIG. 8A. The sliding plate 300 may be locked at a certain position along the rails to stop the sliding plate 300 form moving relative to the board 102. One or more springs may bias (e.g., pull) the sliding plate 300 toward the rear of the watercraft 100 so that the rider can simply bend their legs and allow themselves to slide toward the rear of the watercraft 100 by, at least in part, the force of the springs.

Figure 8C:
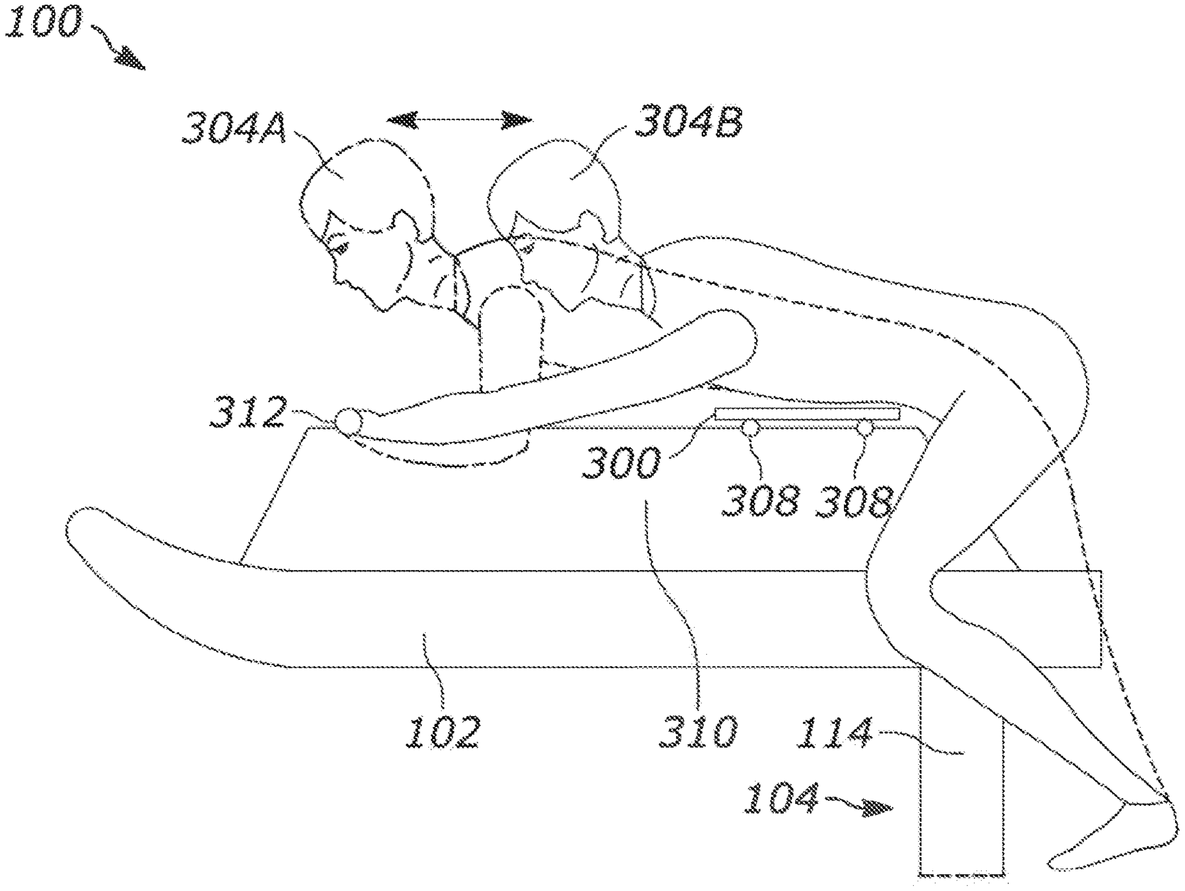
FIG. 8C is a side schematic view of the hydrofoiling watercraft of FIG. 1A including a movable portion according to a third embodiment.

With reference to FIG. 8C, another embodiment of a watercraft 100 having a sliding plate 300 is shown. Similar to the embodiment illustrated in FIG. 8B, the embodiment in FIG. 8C includes a platform upon which the plate 300 slides. In this embodiment, however the pushing block is absent and the user's legs are free to dangle off the sides of the watercraft. Further, in this embodiment, the handle 312 is fixed to the platform 310 or the board 102, allowing the operator to control balance with their arms. Any combination of the fixed portion 302 and handlebars 312 that are fixed or slidable may be used without departing from the spirit of the invention.

In addition or alternative to any of the embodiments described herein, the plate 300 may be able to slide laterally or side-to-side relative to the board 102. This may enable the rider to shift their weight from one side to the other to steer the hydrofoiling watercraft 100. For example, a rider may shift their weight to the left or right side of the board 102 to cause the board 102 to tilt and turn the watercraft in the direction the board 102 is tilting. In some embodiments, the board 300 includes rails that extend laterally. The plate 300 may include wheels or linear bearings that travel along the rails enabling the plate 300 to move laterally across the board 102 similar to rails facilitating longitudinal motion described above. Where the plate 300 is able to move longitudinally and laterally, the plate 300 may be mounted to a first set of rails extending laterally enabling the plate 300 to move laterally. The first set of rails may include wheels or linear bearings attached thereto that engage a second set of rails enabling the first set of rails to move longitudinally along the second set of rails. The plate 300 may thus move laterally and longitudinally relative to the board. In some forms, the plate 300 may include wheels configured to move in all directions (e.g., swivel caster wheels, spherical wheels, or the like) enabling the plate 300 to slide longitudinally and/or laterally relative to the board 102. The plate 300 may include a linkage coupling the plate 300 to the board 102 and preventing the plate 300 from moving substantially vertically relative to the board 102 or becoming detached.

In one form, the rails are arcuate or parabolic. The rails may extend substantially laterally across the board 102. As the rider slides the plate 300 left or right relative to the board 102, the plate 300 may follow the arcuate path of the rails. For example, as the user moves left of right of the center of the board 102 on the plate 300, the user moves slightly forward. This may enable the user to keep their feet planted against or anchored to the pushing block 302, with the remainder of their body pivoting about their feet/the pushing block 302. This ensures that the rider's feet remain in contact with the pushing block 302 so that the rider remains in control of the watercraft 100.

In yet another embodiment, the watercraft 100 may include a saddle or swing seat on which the rider sits during operation of the watercraft 100. The rider may straddle the saddle to sit thereon and place their feet on the top surface of the board 102. The watercraft 100 may include one or more posts at the front of the board 102 and one or more posts at the rear of the board 102 that support the saddle above the top surface of the board 102. The front end of the saddle may be coupled to the front post(s) and the rear end of the saddle may be coupled to the rear post(s) by linkage. The linkage may be flexible and/or elastic to allow the rider to move the saddle longitudinally and laterally relative to the board 102. For example, the linkage may be a rope, elastic cord (e.g., a bungee cord) or chains. In other forms, the linkage includes a rigid bar that attaches to a post and the saddle to form a joint enabling the bar to move or pivot relative to the post and/or saddle. Thus during operation, the rider may sit on the saddle and shift their weight longitudinally (e.g., forward and backward) and/or laterally (e.g., left and right) relative to the board 102. The rider may user their feet that rest on the board 102 to push off the board and shift their weight in a direction relative to the board 102 to adjust the center of gravity of the board 102.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A wireless remote controller of a hydrofoiling watercraft to communicate with the hydrofoiling watercraft, the wireless remote controller comprising:

a user interface including a thumbwheel mounted to a body of the wireless remote controller, the thumbwheel movable relative to the body, the thumbwheel including one or more magnets secured thereto;

a three-dimensional magnetic sensor to sense a magnetic field that changes with movement of the thumbwheel and the one or more magnets secured thereto;

a watertight cavity;

communication circuitry disposed in the watertight cavity;

a processor disposed in the watertight cavity and operably coupled to the three-dimensional magnetic sensor and the communication circuitry, the processor configured to detect user input via the thumbwheel based at least in part on the sensed magnetic field, wherein to detect the user input via the thumbwheel includes determining whether the sensed magnetic field is caused by a stray magnetic field source or by the one or more magnets of the thumbwheel, the processor configured to wirelessly communicate signals to the hydrofoiling watercraft in response to detecting the user input via the thumbwheel;

a battery disposed in the watertight cavity to provide electrical power to the processor and the communication circuitry; and a secondary charging coil disposed in the watertight cavity and operable to charge the battery when the secondary charging coil is proximate to a primary charging coil of a charging dock.

2. The wireless remote controller of claim 1 wherein the processor is configured to receive a signal from the three-dimensional magnetic sensor of the sensed magnetic field and determine a position and/or orientation of the thumbwheel based on at least in part on the sensed magnetic field.

3. The wireless remote controller of claim 1 wherein the thumbwheel is rotatable about an axis and movable along the axis, the processor configured to receive data of the three-dimensional magnetic sensor to determine a rotational and a translational position of the thumbwheel.

4. The wireless remote controller of claim 1 further comprising a pressure sensor to detect when the wireless remote controller is underwater.

5. The wireless remote controller of claim 4 wherein the processor is configured to cease sending a throttle control signal to the hydrofoiling watercraft upon detecting the wireless remote controller is underwater.

6. The wireless remote controller of claim 1 wherein the processor is configured to receive input via the user interface requesting the hydrofoiling watercraft move toward the remote controller, the processor configured to communicate a control signal to the hydrofoiling watercraft to cause the hydrofoiling watercraft to operate autonomously to move toward the remote controller.

7. The wireless remote controller of claim 1 in combination with the charging dock, the charging dock including a first portion having a connector to connect to a battery of the hydrofoiling watercraft to charge the battery of the hydrofoiling watercraft and a second portion adjacent the first portion to receive the wireless remote controller for inductive charging, the second portion having the primary coil.

8. The wireless remote controller of claim 1 further comprising GNSS circuitry to determine a location of the wireless remote controller, the GNSS circuitry disposed in the watertight cavity.

9. The wireless remote controller of claim 1 further comprising a handle portion to be held by a user, wherein the user interface is adjacent the handle portion and includes a display.

10. The wireless remote controller of claim 1 wherein the processor is configured to receive a selection of a ride mode of a plurality of ride modes of the hydrofoiling watercraft via the user interface.

11. The wireless remote controller of claim 1 wherein the processor is configured to receive a selection via the user interface to cause the hydrofoiling watercraft to automatically maintain the hydrofoiling watercraft in a foiling mode.

12. The wireless remote controller of claim 11 wherein the processor is configured to receive a ride height selection via the user interface, the ride height selection being a target ride height the hydrofoiling watercraft operates to achieve when automatically maintaining the hydrofoiling watercraft in the foiling mode.

13. The wireless remote controller of claim 1 wherein the user interface includes a microphone, wherein the processor is configured to receive commands for controlling the hydrofoiling watercraft via the microphone.

14. The wireless remote controller of claim 1 wherein the thumbwheel is rotatable about an axis, wherein the processor is configured to detect a rotational position of the thumbwheel about the axis based at least in part on the sensed magnetic field and to wirelessly communicate signals to the hydrofoiling watercraft based at least in part on the detected rotational position of the thumbwheel.

* * * * *